US012719782B2

(12) United States Patent
Ramaswamy et al.

(10) Patent No.: US 12,719,782 B2
(45) **Date of Patent: *Aug. 25, 2026**

(54) ON DEMAND ROUTING MESH FOR ROUTING PACKETS THROUGH SD-WAN EDGE FORWARDING NODES IN AN SD-WAN

(71) Applicant: VeloCloud Networks, LLC, Santa Clara, CA (US)

(72) Inventors: Navaneeth Krishnan Ramaswamy, Chennai (IN); Gopa Kumar, Milpitas, CA (US)

(73) Assignee: VELOCLOUD NETWORKS, LLC, Santa Clara, CA (US)

( * ) Notice: Subject to any disclaimer, the term of this patent is extended or adjusted under 35 U.S.C. 154(b) by 619 days.

This patent is subject to a terminal disclaimer.

(21) Appl. No.: 18/137,584

(22) Filed: Apr. 21, 2023

(65) Prior Publication Data

US 2023/0261974 A1 Aug. 17, 2023

Related U.S. Application Data

(63) Continuation of application No. 17/351,327, filed on Jun. 18, 2021, now Pat. No. 11,637,768.

(30) Foreign Application Priority Data

May 3, 2021 (IN) ............................ 202141020149

(51) Int. Cl.
*H04L 45/24* (2022.01)
*H04L 12/46* (2006.01)
(Continued)

(52) U.S. Cl.
CPC .......... *H04L 45/24* (2013.01); *H04L 12/4633* (2013.01); *H04L 43/045* (2013.01);
(Continued)

(58) Field of Classification Search
None
See application file for complete search history.

(56) References Cited

U.S. PATENT DOCUMENTS 5,652,751 A 7/1997 Sharony
5,909,553 A 6/1999 Campbell et al.
(Continued)

FOREIGN PATENT DOCUMENTS

CN 1483270 A 3/2004
CN 1926809 A 3/2007
(Continued)

OTHER PUBLICATIONS

Alsaeedi, Mohammed, et al., "Toward Adaptive and Scalable OpenFlow-SDN Flow Control: A Survey," IEEE Access, Aug. 1, 2019, 34 pages, vol. 7, IEEE, retrieved from https://ieeexplore.ieee.org/document/8784036.

(Continued)

*Primary Examiner* — Christine T Duong
(74) *Attorney, Agent, or Firm* — BainwoodHuang

(57) ABSTRACT

Some embodiments of the invention provide a method of facilitating routing through a software-defined wide area network (SD-WAN) defined for an entity. A first edge forwarding node located at a first multi-machine site of the entity, the first multi-machine site at a first physical location and including a first set of machines, serves as an edge forwarding node for the first set of machines by forwarding packets between the first set of machines and other machines associated with the entity via other forwarding nodes in the SD-WAN. The first edge forwarding node receives configuration data specifying for the first edge forwarding node to serve as a hub forwarding node for forwarding a set of packets from a second set of machines associated with the entity and operating at a second multi-machine site at a second physical location to a third set of machines associ- (Continued)

ated with the entity and operating at a third multi-machine site at a third physical location. The first edge forwarding node serves as a hub forwarding node to forward the set of packets from the second set of machines to the third set of machines.

20 Claims, 14 Drawing Sheets

(51) Int. Cl.
*H04L 43/045* (2022.01)
*H04L 43/08* (2022.01)
*H04L 43/16* (2022.01)
*H04L 45/00* (2022.01)
*H04L 45/02* (2022.01)
*H04L 45/122* (2022.01)
*H04L 45/302* (2022.01)
*H04L 45/42* (2022.01)
*H04L 47/122* (2022.01)
*H04L 45/64* (2022.01)

(52) U.S. Cl.
CPC .............. *H04L 43/08* (2013.01); *H04L 43/16* (2013.01); *H04L 45/04* (2013.01); *H04L 45/122* (2013.01); *H04L 45/20* (2013.01); *H04L 45/22* (2013.01); *H04L 45/302* (2013.01); *H04L 45/42* (2013.01); *H04L 45/70* (2013.01); *H04L 47/122* (2013.01); *H04L 45/64* (2013.01)

(56) References Cited

U.S. PATENT DOCUMENTS 6,154,465 A 11/2000 Pickett
6,157,648 A 12/2000 Voit et al.
6,201,810 B1 3/2001 Masuda et al.
6,363,378 B1 3/2002 Conklin et al.
6,445,682 B1 9/2002 Weitz
6,744,775 B1 6/2004 Beshai et al.
6,976,087 B1 12/2005 Westfall et al.
7,003,481 B2 2/2006 Banka et al.
7,280,476 B2 10/2007 Anderson
7,313,629 B1 12/2007 Nucci et al.
7,320,017 B1 1/2008 Kurapati et al.
7,373,660 B1 5/2008 Guichard et al.
7,581,022 B1 8/2009 Griffin et al.
7,680,925 B2 3/2010 Sathyanarayana et al.
7,681,236 B2 3/2010 Tamura et al.
7,751,409 B1 7/2010 Carolan
7,962,458 B2 6/2011 Holenstein et al.
8,051,185 B2 11/2011 Lee et al.
8,094,575 B1 1/2012 Vadlakonda et al.
8,094,659 B1 1/2012 Arad
8,111,692 B2 2/2012 Ray
8,141,156 B1 3/2012 Mao et al.
8,224,971 B1 7/2012 Miller et al.
8,228,928 B2 7/2012 Parandekar et al.
8,243,589 B1 8/2012 Trost et al.
8,259,566 B2 9/2012 Chen et al.
8,274,891 B2 9/2012 Averi et al.
8,301,749 B1 10/2012 Finklestein et al.
8,385,227 B1 2/2013 Downey
8,516,129 B1 8/2013 Skene
8,566,452 B1 10/2013 Goodwin, III et al.
8,588,066 B2 11/2013 Goel et al.
8,630,291 B2 1/2014 Shaffer et al.
8,661,295 B1 2/2014 Khanna et al.
8,724,456 B1 5/2014 Hong et al.
8,724,503 B2 5/2014 Johnsson et al.
8,745,177 B1 6/2014 Kazerani et al.
8,769,129 B2 7/2014 Watsen et al.
8,797,874 B2 8/2014 Yu et al.
8,799,504 B2 8/2014 Capone et al.
8,804,745 B1 8/2014 Sinn
8,806,482 B1 8/2014 Nagargadde et al.
8,855,071 B1 10/2014 Sankaran et al.
8,856,339 B2 10/2014 Mestery et al.
8,964,548 B1 2/2015 Keralapura et al.
8,989,199 B1 3/2015 Sella et al.
9,009,217 B1 4/2015 Nagargadde et al.
9,015,299 B1 4/2015 Shah
9,019,837 B2 4/2015 Lue et al.
9,055,000 B1 6/2015 Ghosh et al.
9,060,025 B2 6/2015 Xu
9,071,607 B2 6/2015 Twitchell, Jr.
9,075,771 B1 7/2015 Gawali et al.
9,100,329 B1 8/2015 Jiang et al.
9,135,037 B1 9/2015 Petrescu-Prahova et al.
9,137,334 B2 9/2015 Zhou
9,154,327 B1 10/2015 Marino et al.
9,203,764 B2 12/2015 Shirazipour et al.
9,225,591 B2 12/2015 Beheshti-Zavareh et al.
9,306,949 B1 4/2016 Richard et al.
9,323,561 B2 4/2016 Ayala et al.
9,336,040 B2 5/2016 Dong et al.
9,354,983 B1 5/2016 Yenamandra et al.
9,356,943 B1 5/2016 Lopilato et al.
9,379,981 B1 6/2016 Zhou et al.
9,413,724 B2 8/2016 Xu
9,419,878 B2 8/2016 Hsiao et al.
9,432,245 B1 8/2016 Sorenson et al.
9,438,566 B2 9/2016 Zhang et al.
9,450,817 B1 9/2016 Bahadur et al.
9,450,852 B1 9/2016 Chen et al.
9,462,010 B1 10/2016 Stevenson
9,467,478 B1 10/2016 Khan et al.
9,485,163 B1 11/2016 Fries et al.
9,521,067 B2 12/2016 Michael et al.
9,525,564 B2 12/2016 Lee
9,542,219 B1 1/2017 Bryant et al.
9,559,951 B1 1/2017 Sajassi et al.
9,563,423 B1 2/2017 Pittman
9,602,389 B1 3/2017 Maveli et al.
9,608,917 B1 3/2017 Anderson et al.
9,608,962 B1 3/2017 Chang
9,614,748 B1 4/2017 Battersby et al.
9,621,460 B2 4/2017 Mehta et al.
9,641,551 B1 5/2017 Kariyanahalli
9,648,547 B1 5/2017 Hart et al.
9,665,432 B2 5/2017 Kruse et al.
9,686,127 B2 6/2017 Ramachandran et al.
9,692,714 B1 6/2017 Nair et al.
9,715,401 B2 7/2017 Devine et al.
9,717,021 B2 7/2017 Hughes et al.
9,722,815 B2 8/2017 Mukundan et al.
9,747,249 B2 8/2017 Cherian et al.
9,755,965 B1 9/2017 Yadav et al.
9,787,559 B1 10/2017 Schroeder
9,807,004 B2 10/2017 Koley et al.
9,819,540 B1 11/2017 Bahadur et al.
9,819,565 B2 11/2017 Djukic et al.
9,825,822 B1 11/2017 Holland
9,825,911 B1 11/2017 Brandwine
9,825,992 B2 11/2017 Xu
9,832,128 B1 11/2017 Ashner et al.
9,832,205 B2 11/2017 Santhi et al.
9,875,355 B1 1/2018 Williams
9,906,401 B1 2/2018 Rao
9,923,826 B2 3/2018 Murgia
9,930,011 B1 3/2018 Clemons, Jr. et al.
9,935,829 B1 4/2018 Miller et al.
9,942,787 B1 4/2018 Tillotson
9,996,370 B1 6/2018 Khafizov et al.
10,038,601 B1 7/2018 Becker et al.
10,057,183 B2 8/2018 Salle et al.
10,057,294 B2 8/2018 Xu
10,116,593 B1 10/2018 Sinn et al.
10,135,789 B2 11/2018 Mayya et al.
10,142,226 B1 11/2018 Wu et al.
10,178,032 B1 1/2019 Freitas
10,178,037 B2 1/2019 Appleby et al.

(56) References Cited

U.S. PATENT DOCUMENTS 10,187,289 B1 1/2019 Chen et al.
10,200,264 B2 2/2019 Menon et al.
10,229,017 B1 3/2019 Zou et al.
10,237,123 B2 3/2019 Dubey et al.
10,250,498 B1 4/2019 Bales et al.
10,263,832 B1 4/2019 Ghosh
10,263,848 B2 4/2019 Wolting
10,320,664 B2 6/2019 Nainar et al.
10,320,691 B1 6/2019 Matthews et al.
10,326,830 B1 6/2019 Singh
10,348,767 B1 7/2019 Lee et al.
10,355,989 B1 7/2019 Panchal et al.
10,425,382 B2 9/2019 Mayya et al.
10,454,708 B2 10/2019 Mibu
10,454,714 B2 10/2019 Mayya et al.
10,461,993 B2 10/2019 Turabi et al.
10,498,652 B2 12/2019 Mayya et al.
10,511,546 B2 12/2019 Singarayan et al.
10,523,539 B2 12/2019 Mayya et al.
10,550,093 B2 2/2020 Ojima et al.
10,554,538 B2 2/2020 Spohn et al.
10,560,431 B1 2/2020 Chen et al.
10,565,464 B2 2/2020 Han et al.
10,567,519 B1 2/2020 Mukhopadhyaya et al.
10,574,482 B2 2/2020 Oré et al.
10,574,528 B2 2/2020 Mayya et al.
10,594,516 B2 3/2020 Cidon et al.
10,594,591 B2 3/2020 Houjyo et al.
10,594,659 B2 3/2020 El-Moussa et al.
10,608,844 B2 3/2020 Cidon et al.
10,630,505 B2 4/2020 Rubenstein et al.
10,637,889 B2 4/2020 Ermagan et al.
10,666,460 B2 5/2020 Cidon et al.
10,666,497 B2 5/2020 Tahhan et al.
10,686,625 B2 6/2020 Cidon et al.
10,693,739 B1 6/2020 Naseri et al.
10,708,144 B2 7/2020 Mohan et al.
10,715,382 B2 7/2020 Guan et al.
10,715,427 B2 7/2020 Raj et al.
10,749,711 B2 8/2020 Mukundan et al.
10,778,466 B2 9/2020 Cidon et al.
10,778,528 B2 9/2020 Mayya et al.
10,778,557 B2 9/2020 Ganichev et al.
10,805,114 B2 10/2020 Cidon et al.
10,805,272 B2 10/2020 Mayya et al.
10,819,564 B2 10/2020 Turabi et al.
10,826,775 B1 11/2020 Moreno et al.
10,841,131 B2 11/2020 Cidon et al.
10,911,374 B1 2/2021 Kumar et al.
10,924,388 B1 2/2021 Burns et al.
10,938,693 B2 3/2021 Mayya et al.
10,951,529 B2 3/2021 Duan et al.
10,958,479 B2 3/2021 Cidon et al.
10,959,098 B2 3/2021 Cidon et al.
10,992,558 B1 4/2021 Silva et al.
10,992,568 B2 4/2021 Michael et al.
10,999,100 B2 5/2021 Cidon et al.
10,999,137 B2 5/2021 Cidon et al.
10,999,165 B2 5/2021 Cidon et al.
10,999,197 B2 5/2021 Hooda et al.
11,005,684 B2 5/2021 Cidon
11,018,995 B2 5/2021 Cidon et al.
11,044,190 B2 6/2021 Ramaswamy et al.
11,050,588 B2 6/2021 Mayya et al.
11,050,644 B2 6/2021 Hegde et al.
11,071,005 B2 7/2021 Shen et al.
11,089,111 B2 8/2021 Markuze et al.
11,095,612 B1 8/2021 Oswal et al.
11,102,032 B2 8/2021 Cidon et al.
11,108,595 B2 8/2021 Knutsen et al.
11,108,851 B1 8/2021 Kurmala et al.
11,115,347 B2 9/2021 Gupta et al.
11,115,426 B1 9/2021 Pazhyannur et al.
11,115,480 B2 9/2021 Markuze et al.
11,121,962 B2 9/2021 Michael et al.
11,121,985 B2 9/2021 Cidon et al.
11,128,492 B2 9/2021 Sethi et al.
11,146,632 B2 10/2021 Rubenstein
11,153,230 B2 10/2021 Cidon et al.
11,171,885 B2 11/2021 Cidon et al.
11,212,140 B2 12/2021 Mukundan et al.
11,212,238 B2 12/2021 Cidon et al.
11,223,514 B2 1/2022 Mayya et al.
11,245,641 B2 2/2022 Ramaswamy et al.
11,252,079 B2 2/2022 Michael et al.
11,252,105 B2 2/2022 Cidon et al.
11,252,106 B2 2/2022 Cidon et al.
11,258,728 B2 2/2022 Cidon et al.
11,310,170 B2 4/2022 Cidon et al.
11,323,307 B2 5/2022 Mayya et al.
11,349,722 B2 5/2022 Mayya et al.
11,363,124 B2 6/2022 Markuze et al.
11,374,904 B2 6/2022 Mayya et al.
11,375,005 B1 6/2022 Rolando et al.
11,381,474 B1 * 7/2022 Kumar ................ H04L 41/5009
11,381,499 B1 7/2022 Ramaswamy et al.
11,388,086 B1 7/2022 Ramaswamy et al.
11,394,640 B2 7/2022 Ramaswamy et al.
11,418,997 B2 8/2022 Devadoss et al.
11,438,789 B2 9/2022 Devadoss et al.
11,444,865 B2 9/2022 Ramaswamy et al.
11,444,872 B2 9/2022 Mayya et al.
11,477,127 B2 10/2022 Ramaswamy et al.
11,489,720 B1 11/2022 Kempanna et al.
11,489,783 B2 11/2022 Ramaswamy et al.
11,509,571 B1 11/2022 Ramaswamy et al.
11,516,049 B2 11/2022 Cidon et al.
11,522,780 B1 12/2022 Wallace et al.
11,526,434 B1 12/2022 Brooker et al.
11,533,248 B2 12/2022 Mayya et al.
11,552,874 B1 1/2023 Pragada et al.
11,575,591 B2 2/2023 Ramaswamy et al.
11,575,600 B2 2/2023 Markuze et al.
11,582,144 B2 2/2023 Ramaswamy et al.
11,582,298 B2 2/2023 Hood et al.
11,601,356 B2 3/2023 Gandhi et al.
11,606,225 B2 3/2023 Cidon et al.
11,606,286 B2 3/2023 Michael et al.
11,606,314 B2 3/2023 Cidon et al.
11,606,712 B2 3/2023 Devadoss et al.
11,611,507 B2 3/2023 Ramaswamy et al.
11,637,768 B2 4/2023 Ramaswamy et al.
11,677,720 B2 6/2023 Mayya et al.
11,689,959 B2 6/2023 Devadoss et al.
11,700,196 B2 7/2023 Michael et al.
11,706,126 B2 7/2023 Silva et al.
11,706,127 B2 7/2023 Michael et al.
11,709,710 B2 7/2023 Markuze et al.
11,716,286 B2 8/2023 Ramaswamy et al.
11,722,925 B2 8/2023 Devadoss et al.
11,729,065 B2 8/2023 Ramaswamy et al.
2002/0049687 A1 4/2002 Helsper et al.
2002/0075542 A1 6/2002 Kumar et al.
2002/0085488 A1 7/2002 Kobayashi
2002/0087716 A1 7/2002 Mustafa
2002/0152306 A1 10/2002 Tuck
2002/0186682 A1 12/2002 Kawano et al.
2002/0198840 A1 12/2002 Banka et al.
2003/0050061 A1 3/2003 Wu et al.
2003/0061269 A1 3/2003 Hathaway et al.
2003/0088697 A1 5/2003 Matsuhira
2003/0112766 A1 6/2003 Riedel et al.
2003/0112808 A1 6/2003 Solomon
2003/0126468 A1 7/2003 Markham
2003/0161313 A1 8/2003 Jinmei et al.
2003/0161321 A1 8/2003 Karam et al.
2003/0189919 A1 10/2003 Gupta et al.
2003/0202506 A1 10/2003 Perkins et al.
2003/0219030 A1 11/2003 Gubbi
2004/0059831 A1 3/2004 Chu et al.
2004/0068668 A1 4/2004 Lor et al.
2004/0165601 A1 8/2004 Liu et al.
2004/0224771 A1 11/2004 Chen et al.
2005/0078690 A1 4/2005 DeLangis

(56) References Cited

U.S. PATENT DOCUMENTS

2005/0149604 A1 7/2005 Navada
2005/0154790 A1 7/2005 Nagata et al.
2005/0172161 A1 8/2005 Cruz et al.
2005/0195754 A1 9/2005 Nosella
2005/0210479 A1 9/2005 Andjelic
2005/0265255 A1 12/2005 Kodialam et al.
2006/0002291 A1 1/2006 Alicherry et al.
2006/0034335 A1 2/2006 Karaoguz et al.
2006/0114838 A1 6/2006 Mandavilli et al.
2006/0171365 A1 8/2006 Borella
2006/0182034 A1 8/2006 Klinker et al.
2006/0182035 A1 8/2006 Vasseur
2006/0193247 A1 8/2006 Naseh et al.
2006/0193252 A1 8/2006 Naseh et al.
2006/0195605 A1 8/2006 Sundarrajan et al.
2006/0245414 A1 11/2006 Susai et al.
2007/0050594 A1 3/2007 Augsburg et al.
2007/0064604 A1 3/2007 Chen et al.
2007/0064702 A1 3/2007 Bates et al.
2007/0083727 A1 4/2007 Johnston et al.
2007/0091794 A1 4/2007 Filsfils et al.
2007/0103548 A1 5/2007 Carter
2007/0115812 A1 5/2007 Hughes
2007/0121486 A1 5/2007 Guichard et al.
2007/0130325 A1 6/2007 Lesser
2007/0162619 A1 7/2007 Aloni et al.
2007/0162639 A1 7/2007 Chu et al.
2007/0177511 A1 8/2007 Das et al.
2007/0195797 A1 8/2007 Patel et al.
2007/0237081 A1 10/2007 Kodialam et al.
2007/0260746 A1 11/2007 Mirtorabi et al.
2007/0268882 A1 11/2007 Breslau et al.
2008/0002670 A1 1/2008 Bugenhagen et al.
2008/0049621 A1 2/2008 McGuire et al.
2008/0055241 A1 3/2008 Goldenberg et al.
2008/0080509 A1 4/2008 Khanna et al.
2008/0095187 A1 4/2008 Jung et al.
2008/0117930 A1 5/2008 Chakareski et al.
2008/0144532 A1 6/2008 Chamarajanagar et al.
2008/0168086 A1 7/2008 Miller et al.
2008/0175150 A1 7/2008 Bolt et al.
2008/0181116 A1 7/2008 Kavanaugh et al.
2008/0219276 A1 9/2008 Shah
2008/0240121 A1 10/2008 Xiong et al.
2008/0263218 A1 10/2008 Beerends et al.
2009/0013210 A1 1/2009 McIntosh et al.
2009/0028092 A1 1/2009 Rothschild
2009/0125617 A1 5/2009 Klessig et al.
2009/0141642 A1 6/2009 Sun
2009/0154463 A1 6/2009 Hines et al.
2009/0182874 A1 7/2009 Morford et al.
2009/0247204 A1 10/2009 Sennett et al.
2009/0268605 A1 10/2009 Campbell et al.
2009/0274045 A1 11/2009 Meier et al.
2009/0276657 A1 11/2009 Wetmore et al.
2009/0303880 A1 12/2009 Maltz et al.
2010/0008361 A1 1/2010 Guichard et al.
2010/0017802 A1 1/2010 Lojewski
2010/0046532 A1 2/2010 Okita
2010/0061379 A1 3/2010 Parandekar et al.
2010/0080129 A1 4/2010 Strahan et al.
2010/0088440 A1 4/2010 Banks et al.
2010/0091782 A1 4/2010 Hiscock
2010/0091823 A1 4/2010 Retana et al.
2010/0098092 A1 4/2010 Luo et al.
2010/0100768 A1 4/2010 Yamamoto et al.
2010/0107162 A1 4/2010 Edwards et al.
2010/0118727 A1 5/2010 Draves et al.
2010/0118886 A1 5/2010 Saavedra
2010/0128600 A1 5/2010 Srinivasmurthy et al.
2010/0165985 A1 7/2010 Sharma et al.
2010/0191884 A1 7/2010 Holenstein et al.
2010/0223621 A1 9/2010 Joshi et al.
2010/0226246 A1 9/2010 Proulx
2010/0290422 A1 11/2010 Haigh et al.
2010/0309841 A1 12/2010 Conte
2010/0309912 A1 12/2010 Mehta et al.
2010/0322255 A1 12/2010 Hao et al.
2010/0332657 A1 12/2010 Elyashev et al.
2011/0001604 A1 1/2011 Ludlow et al.
2011/0007752 A1 1/2011 Silva et al.
2011/0032939 A1 2/2011 Nozaki et al.
2011/0035187 A1 2/2011 DeJori et al.
2011/0040814 A1 2/2011 Higgins
2011/0075674 A1 3/2011 Li et al.
2011/0078783 A1 3/2011 Duan et al.
2011/0107139 A1 5/2011 Middlecamp et al.
2011/0110370 A1 5/2011 Moreno et al.
2011/0141877 A1 6/2011 Xu et al.
2011/0142041 A1 6/2011 Imai
2011/0153909 A1 6/2011 Dong
2011/0235509 A1 9/2011 Szymanski
2011/0255397 A1 10/2011 Kadakia et al.
2011/0302663 A1 12/2011 Prodan et al.
2012/0008630 A1 1/2012 Ould-Brahim
2012/0027013 A1 2/2012 Napierala
2012/0039309 A1 2/2012 Evans et al.
2012/0099601 A1 4/2012 Haddad et al.
2012/0136697 A1 5/2012 Peles et al.
2012/0140935 A1 6/2012 Kruglick
2012/0157068 A1 6/2012 Eichen et al.
2012/0173694 A1 7/2012 Yan et al.
2012/0173919 A1 7/2012 Patel et al.
2012/0182940 A1 7/2012 Taleb et al.
2012/0221955 A1 8/2012 Raleigh et al.
2012/0227093 A1 9/2012 Shatzkamer et al.
2012/0240185 A1 9/2012 Kapoor et al.
2012/0250682 A1 10/2012 Vincent et al.
2012/0250686 A1 10/2012 Vincent et al.
2012/0266026 A1 10/2012 Chikkalingaiah et al.
2012/0281706 A1 11/2012 Agarwal et al.
2012/0287818 A1 11/2012 Corti et al.
2012/0300615 A1 11/2012 Kempf et al.
2012/0307659 A1 12/2012 Yamada
2012/0317270 A1 12/2012 Vrbaski et al.
2012/0317291 A1 12/2012 Wolfe
2013/0007505 A1 1/2013 Spear
2013/0019005 A1 1/2013 Hui et al.
2013/0021968 A1 1/2013 Reznik et al.
2013/0044764 A1 2/2013 Casado et al.
2013/0051237 A1 2/2013 Ong
2013/0051399 A1 2/2013 Zhang et al.
2013/0054763 A1 2/2013 Merwe et al.
2013/0086267 A1 4/2013 Gelenbe et al.
2013/0097304 A1 4/2013 Asthana et al.
2013/0103729 A1 4/2013 Cooney et al.
2013/0103834 A1 4/2013 Dzerve et al.
2013/0117530 A1 5/2013 Kim et al.
2013/0124718 A1 5/2013 Griffith et al.
2013/0124911 A1 5/2013 Griffith et al.
2013/0124912 A1 5/2013 Griffith et al.
2013/0128757 A1 5/2013 Chowdhary et al.
2013/0128889 A1 5/2013 Mathur et al.
2013/0142201 A1 6/2013 Kim et al.
2013/0170354 A1 7/2013 Takashima et al.
2013/0173768 A1 7/2013 Kundu et al.
2013/0173788 A1 7/2013 Song
2013/0182712 A1 7/2013 Aguayo et al.
2013/0185446 A1 7/2013 Zeng et al.
2013/0185729 A1 7/2013 Vasic et al.
2013/0191688 A1 7/2013 Agarwal et al.
2013/0223226 A1 8/2013 Narayanan et al.
2013/0223454 A1 8/2013 Dunbar et al.
2013/0235870 A1 9/2013 Tripathi et al.
2013/0238782 A1 9/2013 Zhao et al.
2013/0242718 A1 9/2013 Zhang
2013/0254599 A1 9/2013 Katkar et al.
2013/0258839 A1 10/2013 Wang et al.
2013/0258847 A1 10/2013 Zhang et al.
2013/0258939 A1 10/2013 Wang
2013/0266015 A1 10/2013 Qu et al.
2013/0266019 A1 10/2013 Qu et al.
2013/0283364 A1 10/2013 Chang et al.
2013/0286846 A1 10/2013 Atlas et al.

(56) References Cited

U.S. PATENT DOCUMENTS

2013/0297611 A1 11/2013 Moritz et al.
2013/0297770 A1 11/2013 Zhang
2013/0301469 A1 11/2013 Suga
2013/0301642 A1 11/2013 Radhakrishnan et al.
2013/0308444 A1 11/2013 Sem-Jacobsen et al.
2013/0315242 A1 11/2013 Wang et al.
2013/0315243 A1 11/2013 Huang et al.
2013/0329548 A1 12/2013 Nakil et al.
2013/0329601 A1 12/2013 Yin et al.
2013/0329734 A1 12/2013 Chesla et al.
2013/0346470 A1 12/2013 Obstfeld et al.
2014/0016464 A1 1/2014 Shirazipour et al.
2014/0019604 A1 1/2014 Twitchell, Jr.
2014/0019750 A1 1/2014 Dodgson et al.
2014/0040975 A1 2/2014 Raleigh et al.
2014/0064283 A1 3/2014 Balus et al.
2014/0071832 A1 3/2014 Johnsson et al.
2014/0092907 A1 4/2014 Sridhar et al.
2014/0108665 A1 4/2014 Arora et al.
2014/0112171 A1 4/2014 Pasdar
2014/0115584 A1 4/2014 Mudigonda et al.
2014/0122559 A1 5/2014 Branson et al.
2014/0123135 A1 5/2014 Huang et al.
2014/0126418 A1 5/2014 Brendel et al.
2014/0156818 A1 6/2014 Hunt
2014/0156823 A1 6/2014 Liu et al.
2014/0157363 A1 6/2014 Banerjee
2014/0160935 A1 6/2014 Zecharia et al.
2014/0164560 A1 6/2014 Ko et al.
2014/0164617 A1 6/2014 Jalan et al.
2014/0164718 A1 6/2014 Schaik et al.
2014/0173113 A1 6/2014 Vemuri et al.
2014/0173331 A1 6/2014 Martin et al.
2014/0181824 A1 6/2014 Saund et al.
2014/0189074 A1 7/2014 Parker
2014/0208317 A1 7/2014 Nakagawa
2014/0219135 A1 8/2014 Li et al.
2014/0223507 A1 8/2014 Xu
2014/0226664 A1 8/2014 Chen et al.
2014/0229210 A1 8/2014 Sharifian et al.
2014/0244851 A1 8/2014 Lee
2014/0258535 A1 9/2014 Zhang
2014/0269690 A1 9/2014 Tu
2014/0279862 A1 9/2014 Dietz et al.
2014/0280499 A1 9/2014 Basavaiah et al.
2014/0310282 A1 10/2014 Sprague et al.
2014/0317440 A1 10/2014 Biermayr et al.
2014/0321277 A1 10/2014 Lynn, Jr. et al.
2014/0337500 A1 11/2014 Lee
2014/0337674 A1 11/2014 Ivancic et al.
2014/0341109 A1 11/2014 Cartmell et al.
2014/0351394 A1 11/2014 Elisha
2014/0355441 A1 12/2014 Jain
2014/0365834 A1 12/2014 Stone et al.
2014/0372582 A1 12/2014 Ghanwani et al.
2015/0003240 A1 1/2015 Drwiega et al.
2015/0016249 A1 1/2015 Mukundan et al.
2015/0029864 A1 1/2015 Raileanu et al.
2015/0039744 A1 2/2015 Niazi et al.
2015/0046572 A1 2/2015 Cheng et al.
2015/0052247 A1 2/2015 Threefoot et al.
2015/0052517 A1 2/2015 Raghu et al.
2015/0056960 A1 2/2015 Egner et al.
2015/0058917 A1 2/2015 Xu
2015/0088942 A1 3/2015 Shah
2015/0089628 A1 3/2015 Lang
2015/0092603 A1 4/2015 Aguayo et al.
2015/0096011 A1 4/2015 Watt
2015/0100958 A1 4/2015 Banavalikar et al.
2015/0106809 A1 4/2015 Reddy et al.
2015/0124603 A1 5/2015 Ketheesan et al.
2015/0134777 A1 5/2015 Onoue
2015/0139238 A1 5/2015 Pourzandi et al.
2015/0146539 A1 5/2015 Mehta et al.
2015/0163152 A1 6/2015 Li
2015/0169340 A1 6/2015 Haddad et al.
2015/0172121 A1 6/2015 Farkas et al.
2015/0172169 A1 6/2015 DeCusatis et al.
2015/0188823 A1 7/2015 Williams et al.
2015/0189009 A1 7/2015 Bemmel
2015/0195178 A1 7/2015 Bhattacharya et al.
2015/0201036 A1 7/2015 Nishiki et al.
2015/0222543 A1 8/2015 Song
2015/0222638 A1 8/2015 Morley
2015/0236945 A1 8/2015 Michael et al.
2015/0236962 A1 8/2015 Veres et al.
2015/0244617 A1 8/2015 Nakil et al.
2015/0249644 A1 9/2015 Xu
2015/0257081 A1 9/2015 Ramanujan et al.
2015/0264055 A1 9/2015 Budhani et al.
2015/0271056 A1 9/2015 Chunduri et al.
2015/0271104 A1 9/2015 Chikkamath et al.
2015/0271303 A1 9/2015 Neginhal et al.
2015/0281004 A1 10/2015 Kakadia et al.
2015/0312142 A1 10/2015 Barabash et al.
2015/0312760 A1 10/2015 O'Toole
2015/0317169 A1 11/2015 Sinha et al.
2015/0326426 A1 11/2015 Luo et al.
2015/0334025 A1 11/2015 Rader
2015/0334696 A1 11/2015 Gu et al.
2015/0341271 A1 11/2015 Gomez
2015/0349978 A1 12/2015 Wu et al.
2015/0350907 A1 12/2015 Timariu et al.
2015/0358232 A1 12/2015 Chen et al.
2015/0358236 A1 12/2015 Roach et al.
2015/0363221 A1 12/2015 Terayama et al.
2015/0363733 A1 12/2015 Brown
2015/0365323 A1 12/2015 Duminuco et al.
2015/0372943 A1 12/2015 Hasan et al.
2015/0372982 A1 12/2015 Herle et al.
2015/0381407 A1 12/2015 Wang et al.
2015/0381462 A1 12/2015 Choi et al.
2015/0381493 A1 12/2015 Bansal et al.
2016/0019317 A1 1/2016 Pawar et al.
2016/0020844 A1 1/2016 Hart et al.
2016/0021597 A1 1/2016 Hart et al.
2016/0035183 A1 2/2016 Buchholz et al.
2016/0036924 A1 2/2016 Koppolu et al.
2016/0036938 A1 2/2016 Aviles et al.
2016/0037434 A1 2/2016 Gopal et al.
2016/0072669 A1 3/2016 Saavedra
2016/0072684 A1 3/2016 Manuguri et al.
2016/0080268 A1 3/2016 Anand et al.
2016/0080502 A1 3/2016 Yadav et al.
2016/0105353 A1 4/2016 Cociglio
2016/0105392 A1 4/2016 Thakkar et al.
2016/0105471 A1 4/2016 Nunes et al.
2016/0105488 A1 4/2016 Thakkar et al.
2016/0117185 A1 4/2016 Fang et al.
2016/0134461 A1 5/2016 Sampath et al.
2016/0134527 A1 5/2016 Kwak et al.
2016/0134528 A1 5/2016 Lin et al.
2016/0134591 A1 5/2016 Liao et al.
2016/0142373 A1 5/2016 Ossipov
2016/0147607 A1 5/2016 Dornemann et al.
2016/0150055 A1 5/2016 Choi
2016/0164832 A1 6/2016 Bellagamba et al.
2016/0164914 A1 6/2016 Madhav et al.
2016/0173338 A1 6/2016 Wolting
2016/0191363 A1 6/2016 Haraszti et al.
2016/0191374 A1 6/2016 Singh et al.
2016/0192403 A1 6/2016 Gupta et al.
2016/0197834 A1 7/2016 Luft
2016/0197835 A1 7/2016 Luft
2016/0198003 A1 7/2016 Luft
2016/0205071 A1 7/2016 Cooper et al.
2016/0210209 A1 7/2016 Verkaik et al.
2016/0212773 A1 7/2016 Kanderholm et al.
2016/0218947 A1 7/2016 Hughes et al.
2016/0218951 A1 7/2016 Vasseur et al.
2016/0234099 A1 8/2016 Jiao
2016/0234161 A1 8/2016 Banerjee et al.
2016/0255169 A1 9/2016 Kovvuri et al.
2016/0255542 A1 9/2016 Hughes et al.

(56) References Cited

U.S. PATENT DOCUMENTS

| | | | |
|---|---|---|---|
| 2016/0261493 | A1 | 9/2016 | Li |
| 2016/0261495 | A1 | 9/2016 | Xia et al. |
| 2016/0261506 | A1 | 9/2016 | Hegde et al. |
| 2016/0261639 | A1 | 9/2016 | Xu |
| 2016/0269298 | A1 | 9/2016 | Li et al. |
| 2016/0269926 | A1 | 9/2016 | Sundaram |
| 2016/0285736 | A1 | 9/2016 | Gu |
| 2016/0299775 | A1 | 10/2016 | Madapurath et al. |
| 2016/0301471 | A1 | 10/2016 | Kunz et al. |
| 2016/0308762 | A1 | 10/2016 | Teng et al. |
| 2016/0315912 | A1 | 10/2016 | Mayya et al. |
| 2016/0323377 | A1 | 11/2016 | Einkauf et al. |
| 2016/0328159 | A1 | 11/2016 | Coddington et al. |
| 2016/0330111 | A1 | 11/2016 | Manghirmalani et al. |
| 2016/0337202 | A1 | 11/2016 | Ben-Itzhak et al. |
| 2016/0352588 | A1 | 12/2016 | Subbarayan et al. |
| 2016/0353268 | A1 | 12/2016 | Senarath et al. |
| 2016/0359738 | A1 | 12/2016 | Sullenberger et al. |
| 2016/0366187 | A1 | 12/2016 | Kamble |
| 2016/0371153 | A1 | 12/2016 | Dornemann |
| 2016/0378527 | A1 | 12/2016 | Zamir |
| 2016/0380886 | A1 | 12/2016 | Blair et al. |
| 2016/0380906 | A1 | 12/2016 | Hodique et al. |
| 2017/0005986 | A1 | 1/2017 | Bansal et al. |
| 2017/0006499 | A1 | 1/2017 | Hampel et al. |
| 2017/0012870 | A1 | 1/2017 | Blair et al. |
| 2017/0019428 | A1 | 1/2017 | Cohn |
| 2017/0024260 | A1 | 1/2017 | Chandrasekaran et al. |
| 2017/0026273 | A1 | 1/2017 | Yao et al. |
| 2017/0026283 | A1 | 1/2017 | Williams et al. |
| 2017/0026355 | A1 | 1/2017 | Mathaiyan et al. |
| 2017/0034046 | A1 | 2/2017 | Cai et al. |
| 2017/0034052 | A1 | 2/2017 | Chanda et al. |
| 2017/0034129 | A1 | 2/2017 | Sawant et al. |
| 2017/0048296 | A1 | 2/2017 | Ramalho et al. |
| 2017/0053258 | A1 | 2/2017 | Carney et al. |
| 2017/0055131 | A1 | 2/2017 | Kong et al. |
| 2017/0063674 | A1 | 3/2017 | Maskalik et al. |
| 2017/0063782 | A1 | 3/2017 | Jain et al. |
| 2017/0063783 | A1 | 3/2017 | Yong et al. |
| 2017/0063794 | A1 | 3/2017 | Jain et al. |
| 2017/0064005 | A1 | 3/2017 | Lee |
| 2017/0075710 | A1 | 3/2017 | Prasad et al. |
| 2017/0093625 | A1 | 3/2017 | Pera et al. |
| 2017/0097841 | A1 | 4/2017 | Chang et al. |
| 2017/0104653 | A1 | 4/2017 | Badea et al. |
| 2017/0104755 | A1 | 4/2017 | Arregoces et al. |
| 2017/0109212 | A1 | 4/2017 | Gaurav et al. |
| 2017/0118067 | A1 | 4/2017 | Vedula |
| 2017/0118173 | A1 | 4/2017 | Arramreddy et al. |
| 2017/0123939 | A1 | 5/2017 | Maheshwari et al. |
| 2017/0126475 | A1 | 5/2017 | Mahkonen et al. |
| 2017/0126516 | A1 | 5/2017 | Tiagi et al. |
| 2017/0126564 | A1 | 5/2017 | Mayya et al. |
| 2017/0134186 | A1 | 5/2017 | Mukundan et al. |
| 2017/0134520 | A1 | 5/2017 | Abbasi et al. |
| 2017/0139789 | A1 | 5/2017 | Fries et al. |
| 2017/0142000 | A1 | 5/2017 | Cai et al. |
| 2017/0149637 | A1 | 5/2017 | Banikazemi et al. |
| 2017/0155557 | A1 | 6/2017 | Desai et al. |
| 2017/0155566 | A1 | 6/2017 | Martinsen et al. |
| 2017/0155590 | A1 | 6/2017 | Dillon et al. |
| 2017/0163473 | A1 | 6/2017 | Sadana et al. |
| 2017/0171024 | A1 | 6/2017 | Anerousis et al. |
| 2017/0171310 | A1 | 6/2017 | Gardner |
| 2017/0180220 | A1 | 6/2017 | Leckey et al. |
| 2017/0181210 | A1 | 6/2017 | Nadella et al. |
| 2017/0195161 | A1 | 7/2017 | Ruel et al. |
| 2017/0195169 | A1 | 7/2017 | Mills et al. |
| 2017/0201568 | A1 | 7/2017 | Hussam et al. |
| 2017/0201585 | A1 | 7/2017 | Doraiswamy et al. |
| 2017/0207976 | A1 | 7/2017 | Rovner et al. |
| 2017/0214545 | A1 | 7/2017 | Cheng et al. |
| 2017/0214701 | A1 | 7/2017 | Hasan |
| 2017/0223117 | A1 | 8/2017 | Messerli et al. |
| 2017/0236060 | A1 | 8/2017 | Ignatyev |
| 2017/0237710 | A1 | 8/2017 | Mayya et al. |
| 2017/0242784 | A1 | 8/2017 | Heorhiadi et al. |
| 2017/0257260 | A1 | 9/2017 | Govindan et al. |
| 2017/0257309 | A1 | 9/2017 | Appanna |
| 2017/0264496 | A1 | 9/2017 | Ao et al. |
| 2017/0279717 | A1 | 9/2017 | Bethers et al. |
| 2017/0279741 | A1 | 9/2017 | Elias et al. |
| 2017/0279803 | A1 | 9/2017 | Desai et al. |
| 2017/0280474 | A1 | 9/2017 | Vesterinen et al. |
| 2017/0288987 | A1 | 10/2017 | Pasupathy et al. |
| 2017/0289002 | A1 | 10/2017 | Ganguli et al. |
| 2017/0289027 | A1 | 10/2017 | Ratnasingham |
| 2017/0295264 | A1 | 10/2017 | Touitou et al. |
| 2017/0302501 | A1 | 10/2017 | Shi et al. |
| 2017/0302565 | A1 | 10/2017 | Ghobadi et al. |
| 2017/0310641 | A1 | 10/2017 | Jiang et al. |
| 2017/0310691 | A1 | 10/2017 | Vasseur et al. |
| 2017/0317945 | A1 | 11/2017 | Guo et al. |
| 2017/0317954 | A1 | 11/2017 | Masurekar et al. |
| 2017/0317969 | A1 | 11/2017 | Masurekar et al. |
| 2017/0317974 | A1 | 11/2017 | Masurekar et al. |
| 2017/0324628 | A1 | 11/2017 | Dhanabalan |
| 2017/0337086 | A1 | 11/2017 | Zhu et al. |
| 2017/0339022 | A1 | 11/2017 | Hegde et al. |
| 2017/0339054 | A1 | 11/2017 | Yadav et al. |
| 2017/0339070 | A1 | 11/2017 | Chang et al. |
| 2017/0346722 | A1 | 11/2017 | Smith et al. |
| 2017/0364419 | A1 | 12/2017 | Lo |
| 2017/0366445 | A1 | 12/2017 | Nemirovsky et al. |
| 2017/0366467 | A1 | 12/2017 | Martin et al. |
| 2017/0373950 | A1 | 12/2017 | Szilagyi et al. |
| 2017/0374174 | A1 | 12/2017 | Evens et al. |
| 2018/0006995 | A1 | 1/2018 | Bickhart et al. |
| 2018/0007005 | A1 | 1/2018 | Chanda et al. |
| 2018/0007123 | A1 | 1/2018 | Cheng et al. |
| 2018/0013636 | A1 | 1/2018 | Seetharamaiah et al. |
| 2018/0014051 | A1 | 1/2018 | Phillips et al. |
| 2018/0020035 | A1 | 1/2018 | Boggia et al. |
| 2018/0034668 | A1 | 2/2018 | Mayya et al. |
| 2018/0041425 | A1 | 2/2018 | Zhang |
| 2018/0041470 | A1 | 2/2018 | Schultz et al. |
| 2018/0062875 | A1 | 3/2018 | Tumuluru |
| 2018/0062914 | A1 | 3/2018 | Boutros et al. |
| 2018/0062917 | A1 | 3/2018 | Chandrashekhar et al. |
| 2018/0063036 | A1 | 3/2018 | Chandrashekhar et al. |
| 2018/0063193 | A1 | 3/2018 | Chandrashekhar et al. |
| 2018/0063233 | A1 | 3/2018 | Park |
| 2018/0063743 | A1 | 3/2018 | Tumuluru et al. |
| 2018/0069924 | A1 | 3/2018 | Tumuluru et al. |
| 2018/0074909 | A1 | 3/2018 | Bishop et al. |
| 2018/0077081 | A1 | 3/2018 | Lauer et al. |
| 2018/0077202 | A1 | 3/2018 | Xu |
| 2018/0084081 | A1 | 3/2018 | Kuchibhotla et al. |
| 2018/0091370 | A1 | 3/2018 | Arai |
| 2018/0097725 | A1 | 4/2018 | Wood et al. |
| 2018/0114569 | A1 | 4/2018 | Strachan et al. |
| 2018/0123910 | A1 | 5/2018 | Fitzgibbon |
| 2018/0123946 | A1 | 5/2018 | Ramachandran et al. |
| 2018/0131608 | A1 | 5/2018 | Jiang et al. |
| 2018/0131615 | A1 | 5/2018 | Zhang |
| 2018/0131720 | A1 | 5/2018 | Hobson et al. |
| 2018/0145899 | A1 | 5/2018 | Rao |
| 2018/0159796 | A1 | 6/2018 | Wang et al. |
| 2018/0159856 | A1 | 6/2018 | Gujarathi |
| 2018/0167378 | A1 | 6/2018 | Kostyukov et al. |
| 2018/0176073 | A1 | 6/2018 | Dubey et al. |
| 2018/0176082 | A1 | 6/2018 | Katz et al. |
| 2018/0176130 | A1 | 6/2018 | Banerjee et al. |
| 2018/0176252 | A1 | 6/2018 | Nimmagadda et al. |
| 2018/0181423 | A1 | 6/2018 | Gunda et al. |
| 2018/0205746 | A1 | 7/2018 | Boutnaru et al. |
| 2018/0213472 | A1 | 7/2018 | Ishii et al. |
| 2018/0219765 | A1 | 8/2018 | Michael et al. |
| 2018/0219766 | A1 | 8/2018 | Michael et al. |
| 2018/0234300 | A1 | 8/2018 | Mayya et al. |
| 2018/0248790 | A1 | 8/2018 | Tan et al. |
| 2018/0260125 | A1 | 9/2018 | Botes et al. |
| 2018/0261085 | A1 | 9/2018 | Liu et al. |

(56) References Cited

U.S. PATENT DOCUMENTS

2018/0262468 A1 9/2018 Kumar et al.
2018/0270104 A1 9/2018 Zheng et al.
2018/0278541 A1 9/2018 Wu et al.
2018/0287907 A1 10/2018 Kulshreshtha et al.
2018/0295101 A1 10/2018 Gehrmann
2018/0295529 A1 10/2018 Jen et al.
2018/0302286 A1 10/2018 Mayya et al.
2018/0302321 A1 10/2018 Manthiramoorthy et al.
2018/0307851 A1 10/2018 Lewis
2018/0316606 A1 11/2018 Sung et al.
2018/0351855 A1 12/2018 Sood et al.
2018/0351862 A1 12/2018 Jeganathan et al.
2018/0351863 A1 12/2018 Vairavakkalai et al.
2018/0351882 A1 12/2018 Jeganathan et al.
2018/0359323 A1 12/2018 Madden
2018/0367445 A1 12/2018 Bajaj
2018/0373558 A1 12/2018 Chang et al.
2018/0375744 A1 12/2018 Mayya et al.
2018/0375824 A1 12/2018 Mayya et al.
2018/0375967 A1 12/2018 Pithawala et al.
2019/0013883 A1 1/2019 Vargas et al.
2019/0014038 A1 1/2019 Ritchie
2019/0020588 A1 1/2019 Twitchell, Jr.
2019/0020627 A1 1/2019 Yuan
2019/0021085 A1 1/2019 Mochizuki et al.
2019/0028378 A1 1/2019 Houjyo et al.
2019/0028552 A1 1/2019 Johnson et al.
2019/0036808 A1 1/2019 Shenoy et al.
2019/0036810 A1 1/2019 Michael et al.
2019/0036813 A1 1/2019 Shenoy et al.
2019/0046056 A1 2/2019 Khachaturian et al.
2019/0058657 A1 2/2019 Chunduri et al.
2019/0058709 A1 2/2019 Kempf et al.
2019/0068470 A1 2/2019 Mirsky
2019/0068493 A1 2/2019 Ram et al.
2019/0068500 A1 2/2019 Hira
2019/0075083 A1 3/2019 Mayya et al.
2019/0081894 A1 3/2019 Yousaf et al.
2019/0103990 A1 4/2019 Cidon et al.
2019/0103991 A1 4/2019 Cidon et al.
2019/0103992 A1 4/2019 Cidon et al.
2019/0103993 A1 4/2019 Cidon et al.
2019/0104035 A1 4/2019 Cidon et al.
2019/0104049 A1 4/2019 Cidon et al.
2019/0104050 A1 4/2019 Cidon et al.
2019/0104051 A1 4/2019 Cidon et al.
2019/0104052 A1 4/2019 Cidon et al.
2019/0104053 A1 4/2019 Cidon et al.
2019/0104063 A1 4/2019 Cidon et al.
2019/0104064 A1 4/2019 Cidon et al.
2019/0104109 A1 4/2019 Cidon et al.
2019/0104111 A1 4/2019 Cidon et al.
2019/0104413 A1 4/2019 Cidon et al.
2019/0109769 A1 4/2019 Jain et al.
2019/0132221 A1 5/2019 Boutros et al.
2019/0132234 A1 5/2019 Dong et al.
2019/0132322 A1 5/2019 Song et al.
2019/0140889 A1 5/2019 Mayya et al.
2019/0140890 A1 5/2019 Mayya et al.
2019/0149525 A1 5/2019 Gunda et al.
2019/0158371 A1 5/2019 Dillon et al.
2019/0158605 A1 5/2019 Markuze et al.
2019/0199539 A1 6/2019 Deng et al.
2019/0220703 A1 7/2019 Prakash et al.
2019/0222499 A1 7/2019 Chen et al.
2019/0238364 A1 8/2019 Boutros et al.
2019/0238446 A1 8/2019 Barzik et al.
2019/0238449 A1 8/2019 Michael et al.
2019/0238450 A1 8/2019 Michael et al.
2019/0238483 A1 8/2019 Marichetty et al.
2019/0238497 A1 8/2019 Tourrilhes et al.
2019/0268421 A1 8/2019 Markuze et al.
2019/0268973 A1 8/2019 Bull et al.
2019/0278631 A1 9/2019 Bernat et al.
2019/0280962 A1 9/2019 Michael et al.
2019/0280963 A1 9/2019 Michael et al.
2019/0280964 A1 9/2019 Michael et al.
2019/0288875 A1 9/2019 Shen et al.
2019/0306197 A1 10/2019 Degioanni
2019/0306282 A1 10/2019 Masputra et al.
2019/0313278 A1 10/2019 Liu
2019/0313907 A1 10/2019 Khachaturian et al.
2019/0319847 A1 10/2019 Nahar et al.
2019/0319881 A1 10/2019 Maskara et al.
2019/0327109 A1 10/2019 Guichard et al.
2019/0334786 A1 10/2019 Dutta et al.
2019/0334813 A1 10/2019 Raj et al.
2019/0334820 A1 10/2019 Zhao
2019/0342201 A1 11/2019 Singh
2019/0342219 A1 11/2019 Liu et al.
2019/0356736 A1 11/2019 Narayanaswamy et al.
2019/0364099 A1 11/2019 Thakkar et al.
2019/0364456 A1 11/2019 Yu
2019/0372888 A1 12/2019 Michael et al.
2019/0372889 A1 12/2019 Michael et al.
2019/0372890 A1 12/2019 Michael et al.
2019/0394081 A1 12/2019 Tahhan et al.
2020/0014609 A1 1/2020 Hockett et al.
2020/0014615 A1 1/2020 Michael et al.
2020/0014616 A1 1/2020 Michael et al.
2020/0014661 A1 1/2020 Mayya et al.
2020/0014663 A1 1/2020 Chen et al.
2020/0021514 A1 1/2020 Michael et al.
2020/0021515 A1 1/2020 Michael et al.
2020/0036624 A1 1/2020 Michael et al.
2020/0044943 A1 2/2020 Bor-Yaliniz et al.
2020/0044969 A1 2/2020 Hao et al.
2020/0059420 A1 2/2020 Abraham
2020/0059457 A1 2/2020 Raza et al.
2020/0059459 A1 2/2020 Abraham et al.
2020/0067831 A1 2/2020 Spraggins et al.
2020/0092207 A1 3/2020 Sipra et al.
2020/0097327 A1 3/2020 Beyer et al.
2020/0099625 A1 3/2020 Yigit et al.
2020/0099659 A1 3/2020 Cometto et al.
2020/0106696 A1 4/2020 Michael et al.
2020/0106706 A1 4/2020 Mayya et al.
2020/0119952 A1 4/2020 Mayya et al.
2020/0127905 A1 4/2020 Mayya et al.
2020/0127911 A1 4/2020 Gilson et al.
2020/0153701 A1 5/2020 Mohan et al.
2020/0153736 A1 5/2020 Liebherr et al.
2020/0159661 A1 5/2020 Keymolen et al.
2020/0162407 A1 5/2020 Tillotson
2020/0169473 A1 5/2020 Rimar et al.
2020/0177503 A1 6/2020 Hooda et al.
2020/0177550 A1 6/2020 Valluri et al.
2020/0177629 A1 6/2020 Hooda et al.
2020/0186471 A1 6/2020 Shen et al.
2020/0195557 A1 6/2020 Duan et al.
2020/0204460 A1 6/2020 Schneider et al.
2020/0213212 A1 7/2020 Dillon et al.
2020/0213224 A1 7/2020 Cheng et al.
2020/0218558 A1 7/2020 Sreenath et al.
2020/0235990 A1 7/2020 Janakiraman et al.
2020/0235999 A1 7/2020 Mayya et al.
2020/0236046 A1 7/2020 Jain et al.
2020/0241927 A1 7/2020 Yang et al.
2020/0244721 A1 7/2020 S et al.
2020/0252234 A1 8/2020 Ramamoorthi et al.
2020/0259700 A1 8/2020 Bhalla et al.
2020/0267184 A1 8/2020 Vera-Schockner
2020/0267203 A1 8/2020 Jindal et al.
2020/0280587 A1 9/2020 Janakiraman et al.
2020/0287819 A1 9/2020 Theogaraj et al.
2020/0287976 A1 9/2020 Theogaraj et al.
2020/0296011 A1 9/2020 Jain et al.
2020/0296026 A1 9/2020 Michael et al.
2020/0301764 A1 9/2020 Thoresen et al.
2020/0314006 A1 10/2020 Mackie et al.
2020/0314614 A1 10/2020 Moustafa et al.
2020/0322230 A1 10/2020 Natal et al.
2020/0322287 A1 10/2020 Connor et al.
2020/0336336 A1 10/2020 Sethi et al.

(56) References Cited

U.S. PATENT DOCUMENTS

2020/0344089 A1 10/2020 Motwani et al.
2020/0344143 A1 10/2020 Faseela et al.
2020/0344163 A1 10/2020 Gupta et al.
2020/0351188 A1 11/2020 Arora et al.
2020/0358878 A1 11/2020 Bansal et al.
2020/0366530 A1 11/2020 Mukundan et al.
2020/0366562 A1 11/2020 Mayya et al.
2020/0382345 A1 12/2020 Zhao et al.
2020/0382387 A1 12/2020 Pasupathy et al.
2020/0403821 A1 12/2020 Dev et al.
2020/0412483 A1 12/2020 Tan et al.
2020/0412576 A1 12/2020 Kondapavuluru et al.
2020/0413283 A1 12/2020 Shen et al.
2021/0006482 A1 1/2021 Hwang et al.
2021/0006490 A1 1/2021 Michael et al.
2021/0021538 A1 1/2021 Meck et al.
2021/0029019 A1 1/2021 Kottapalli
2021/0029088 A1 1/2021 Mayya et al.
2021/0036888 A1 2/2021 Makkalla et al.
2021/0036987 A1 2/2021 Mishra et al.
2021/0037159 A1 2/2021 Shimokawa
2021/0049191 A1 2/2021 Masson et al.
2021/0067372 A1 3/2021 Cidon et al.
2021/0067373 A1 3/2021 Cidon et al.
2021/0067374 A1 3/2021 Cidon et al.
2021/0067375 A1 3/2021 Cidon et al.
2021/0067407 A1 3/2021 Cidon et al.
2021/0067427 A1 3/2021 Cidon et al.
2021/0067442 A1 3/2021 Sundararajan et al.
2021/0067461 A1 3/2021 Cidon et al.
2021/0067464 A1 3/2021 Cidon et al.
2021/0067467 A1 3/2021 Cidon et al.
2021/0067468 A1 3/2021 Cidon et al.
2021/0073001 A1 3/2021 Rogers et al.
2021/0092062 A1 3/2021 Dhanabalan et al.
2021/0099360 A1 4/2021 Parsons et al.
2021/0105199 A1 4/2021 C H et al.
2021/0111998 A1 4/2021 Saavedra
2021/0112034 A1 4/2021 Sundararajan et al.
2021/0126830 A1 4/2021 R et al.
2021/0126853 A1 4/2021 Ramaswamy et al.
2021/0126854 A1 4/2021 Guo et al.
2021/0126860 A1 4/2021 Ramaswamy et al.
2021/0144091 A1 5/2021 C H et al.
2021/0160169 A1 5/2021 Shen et al.
2021/0160813 A1 5/2021 Gupta et al.
2021/0176255 A1 6/2021 Hill et al.
2021/0184952 A1 6/2021 Mayya et al.
2021/0184966 A1 6/2021 Ramaswamy et al.
2021/0184983 A1 6/2021 Ramaswamy et al.
2021/0194814 A1 6/2021 Roux et al.
2021/0226880 A1 7/2021 Ramamoorthy et al.
2021/0234728 A1 7/2021 Cidon et al.
2021/0234775 A1 7/2021 Devadoss et al.
2021/0234786 A1 7/2021 Devadoss et al.
2021/0234804 A1 7/2021 Devadoss et al.
2021/0234805 A1 7/2021 Devadoss et al.
2021/0235312 A1 7/2021 Devadoss et al.
2021/0235313 A1 7/2021 Devadoss et al.
2021/0266262 A1 8/2021 Subramanian et al.
2021/0279069 A1 9/2021 Salgaonkar et al.
2021/0288881 A1* 9/2021 Zhang .................. H04L 47/825
2021/0314289 A1 10/2021 Chandrashekhar et al.
2021/0314385 A1 10/2021 Pande et al.
2021/0328835 A1 10/2021 Mayya et al.
2021/0336880 A1 10/2021 Gupta et al.
2021/0377109 A1 12/2021 Shrivastava et al.
2021/0377156 A1 12/2021 Michael et al.
2021/0392060 A1 12/2021 Silva et al.
2021/0392070 A1 12/2021 Tootaghaj et al.
2021/0392171 A1 12/2021 Srinivas et al.
2021/0399920 A1 12/2021 Sundararajan et al.
2021/0399978 A9 12/2021 Michael et al.
2021/0400113 A1 12/2021 Markuze et al.
2021/0400512 A1 12/2021 Agarwal et al.
2021/0409277 A1 12/2021 Jeuk et al.
2022/0006726 A1 1/2022 Michael et al.
2022/0006751 A1 1/2022 Ramaswamy et al.
2022/0006756 A1 1/2022 Ramaswamy et al.
2022/0029902 A1 1/2022 Shemer et al.
2022/0035673 A1 2/2022 Markuze et al.
2022/0038370 A1 2/2022 Vasseur et al.
2022/0038557 A1 2/2022 Markuze et al.
2022/0045927 A1 2/2022 Liu et al.
2022/0052928 A1 2/2022 Sundararajan et al.
2022/0061059 A1 2/2022 Dunsmore et al.
2022/0086035 A1 3/2022 Devaraj et al.
2022/0094644 A1 3/2022 Cidon et al.
2022/0123961 A1 4/2022 Mukundan et al.
2022/0131740 A1 4/2022 Mayya et al.
2022/0131807 A1 4/2022 Srinivas et al.
2022/0131898 A1 4/2022 Hooda et al.
2022/0141184 A1 5/2022 Oswal et al.
2022/0158923 A1 5/2022 Ramaswamy et al.
2022/0158924 A1 5/2022 Ramaswamy et al.
2022/0158926 A1 5/2022 Wennerström et al.
2022/0166713 A1 5/2022 Markuze et al.
2022/0191719 A1 6/2022 Roy
2022/0198229 A1 6/2022 López et al.
2022/0210035 A1 6/2022 Hendrickson et al.
2022/0210041 A1 6/2022 Gandhi et al.
2022/0210042 A1 6/2022 Gandhi et al.
2022/0210122 A1 6/2022 Levin et al.
2022/0217015 A1 7/2022 Vuggrala et al.
2022/0231949 A1 7/2022 Ramaswamy et al.
2022/0231950 A1 7/2022 Ramaswamy et al.
2022/0232411 A1 7/2022 Vijayakumar et al.
2022/0239596 A1 7/2022 Kumar et al.
2022/0294701 A1 9/2022 Mayya et al.
2022/0335027 A1 10/2022 Seshadri et al.
2022/0337553 A1 10/2022 Mayya et al.
2022/0353152 A1 11/2022 Ramaswamy
2022/0353171 A1 11/2022 Ramaswamy et al.
2022/0353175 A1 11/2022 Ramaswamy et al.
2022/0353182 A1 11/2022 Ramaswamy et al.
2022/0353190 A1 11/2022 Ramaswamy et al.
2022/0360500 A1 11/2022 Ramaswamy et al.
2022/0407773 A1 12/2022 Kempanna et al.
2022/0407774 A1 12/2022 Kempanna et al.
2022/0407790 A1 12/2022 Kempanna et al.
2022/0407820 A1 12/2022 Kempanna et al.
2022/0407915 A1 12/2022 Kempanna et al.
2023/0006929 A1 1/2023 Mayya et al.
2023/0025586 A1 1/2023 Rolando et al.
2023/0026330 A1 1/2023 Rolando et al.
2023/0026865 A1 1/2023 Rolando et al.
2023/0028872 A1 1/2023 Ramaswamy
2023/0039869 A1 2/2023 Ramaswamy et al.
2023/0041916 A1 2/2023 Zhang et al.
2023/0054961 A1 2/2023 Ramaswamy et al.
2023/0105680 A1 4/2023 Simlai et al.
2023/0121871 A1 4/2023 Mayya et al.
2023/0164158 A1 5/2023 Fellows et al.
2023/0179445 A1 6/2023 Cidon et al.
2023/0179502 A1 6/2023 Ramaswamy et al.
2023/0179521 A1 6/2023 Markuze et al.
2023/0179543 A1 6/2023 Cidon et al.
2023/0216768 A1 7/2023 Zohar et al.
2023/0216801 A1 7/2023 Markuze et al.
2023/0216804 A1 7/2023 Zohar et al.
2023/0221874 A1 7/2023 Markuze et al.
2023/0224356 A1 7/2023 Markuze et al.
2023/0224759 A1 7/2023 Ramaswamy
2023/0231845 A1 7/2023 Manoharan et al.
2023/0239234 A1 7/2023 Zohar et al.
2023/0308421 A1 9/2023 Mayya et al.

FOREIGN PATENT DOCUMENTS

CN 102577270 A 7/2012
CN 102811165 A 12/2012
CN 104205757 A 12/2014
CN 104956329 A 9/2015
CN 106230650 A 12/2016

(56) References Cited

FOREIGN PATENT DOCUMENTS

| | | | |
|---|---|---|---|
| CN | 106656847 | A | 5/2017 |
| CN | 106998284 | A | 8/2017 |
| CN | 110447209 | A | 11/2019 |
| CN | 111198764 | A | 5/2020 |
| EP | 1031224 | B1 | 3/2005 |
| EP | 1912381 | A1 | 4/2008 |
| EP | 2538637 | A2 | 12/2012 |
| EP | 2763362 | A1 | 8/2014 |
| EP | 3041178 | A1 | 7/2016 |
| EP | 3297211 | A1 | 3/2018 |
| EP | 3509256 | A1 | 7/2019 |
| EP | 3346650 | B1 | 11/2019 |
| JP | 2002368792 | A | 12/2002 |
| JP | 2010233126 | A | 10/2010 |
| JP | 2014200010 | A | 10/2014 |
| JP | 2017059991 | A | 3/2017 |
| JP | 2017524290 | A | 8/2017 |
| KR | 20170058201 | A | 5/2017 |
| RU | 2574350 | C2 | 2/2016 |
| WO | 2000078004 | A2 | 12/2000 |
| WO | 03073701 | A1 | 9/2003 |
| WO | 2005071861 | A1 | 8/2005 |
| WO | 2007016834 | A1 | 2/2007 |
| WO | 2012167184 | A2 | 12/2012 |
| WO | 2015092565 | A1 | 6/2015 |
| WO | 2016061546 | A1 | 4/2016 |
| WO | 2016123314 | A1 | 8/2016 |
| WO | 2017083975 | A1 | 5/2017 |
| WO | 2019070611 | A1 | 4/2019 |
| WO | 2019094522 | A1 | 5/2019 |
| WO | 2020012491 | A1 | 1/2020 |
| WO | 2020018704 | A1 | 1/2020 |
| WO | 2020091777 | A1 | 5/2020 |
| WO | 2020101922 | A1 | 5/2020 |
| WO | 2020112345 | A1 | 6/2020 |
| WO | 2021040934 | A1 | 3/2021 |
| WO | 2021118717 | A1 | 6/2021 |
| WO | 2021150465 | A1 | 7/2021 |
| WO | 2021211906 | A1 | 10/2021 |
| WO | 2022005607 | A1 | 1/2022 |
| WO | 2022082680 | A1 | 4/2022 |
| WO | 2022154850 | A1 | 7/2022 |
| WO | 2022159156 | A1 | 7/2022 |
| WO | 2022231668 | A1 | 11/2022 |
| WO | 2022235303 | A1 | 11/2022 |
| WO | 2022265681 | A1 | 12/2022 |
| WO | 2023009159 | A1 | 2/2023 |

OTHER PUBLICATIONS

Alvizu, Rodolfo, et al., "SDN-Based Network Orchestration for New Dynamic Enterprise Networking Services," 2017 19th International Conference on Transparent Optical Networks, Jul. 2-6, 2017, 4 pages, IEEE, Girona, Spain.

Author Unknown, "VeloCloud Administration Guide: VMware SD-WAN by VeloCloud 3.3," Month Unknown 2019, 366 pages, VMware, Inc., Palo Alto, CA, USA.

Barozet, Jean-Marc, "Cisco SD-WAN as a Managed Service," BRKRST-2558, Jan. 27-31, 2020, 98 pages, Cisco, Barcelona, Spain, retrieved from https://www.ciscolive.com/c/dam/r/ciscolive/emea/docs/2020/pdf/BRKRST-2558.pdf.

Barozet, Jean-Marc, "Cisco SDWAN," Deep Dive, Dec. 2017, 185 pages, Cisco, Retreived from https://www.coursehero.com/file/71671376/Cisco-SDWAN-Deep-Divepdf/.

Bertaux, Lionel, et al., "Software Defined Networking and Virtualization for Broadband Satellite Networks," IEEE Communications Magazine, Mar. 18, 2015, 7 pages, vol. 53, IEEE, retrieved from https://ieeexplore.ieee.org/document/7060482.

Cox, Jacob H., et al., "Advancing Software-Defined Networks: A Survey," IEEE Access, Oct. 12, 2017, 40 pages, vol. 5, IEEE, retrieved from https://ieeexplore.ieee.org/document/8066287.

Del Piccolo, Valentin, et al., "A Survey of Network Isolation Solutions for Multi-Tenant Data Centers," IEEE Communications Society, Apr. 20, 2016, vol. 18, No. 4, 37 pages, IEEE.

Duan, Zhenhai, et al., "Service Overlay Networks: SLAs, QoS, and Bandwidth Provisioning," IEEE/ACM Transactions on Networking, Dec. 2003, 14 pages, vol. 11, IEEE, New York, NY, USA.

Fortz, Bernard, et al., "Internet Traffic Engineering by Optimizing OSPF Weights," Proceedings IEEE INFOCOM 2000, Conference on Computer Communications, Nineteenth Annual Joint Conference of the IEEE Computer and Communications Societies, Mar. 26-30, 2000, 11 pages, IEEE, Tel Aviv, Israel, Israel.

Francois, Frederic, et al., "Optimizing Secure SDN-enabled Inter-Data Centre Overlay Networks through Cognitive Routing," 2016 IEEE 24th International Symposium on Modeling, Analysis and Simulation of Computer and Telecommunication Systems (MASCOTS), Sep. 19-21, 2016, 10 pages, IEEE, London, UK.

Guo, Xiangyi, et al., (U.S. Appl. No. 62/925,193), filed Oct. 23, 2019, 26 pages.

Huang, Cancan, et al., "Modification of Q.SD-WAN," Rapporteur Group Meeting—Doc, Study Period 2017-2020, Q4/11-DOC1 (190410), Study Group 11, Apr. 10, 2019, 19 pages, International Telecommunication Union, Geneva, Switzerland.

Jivorasetkul, Supalerk, et al., "End-to-End Header Compression over Software-Defined Networks: a Low Latency Network Architecture," 2012 Fourth International Conference on Intelligent Networking and Collaborative Systems, Sep. 19-21, 2012, 2 pages, IEEE, Bucharest, Romania.

Lasserre, Marc, et al., "Framework for Data Center (DC) Network Virtualization," RFC 7365, Oct. 2014, 26 pages, IETF.

Li, Shengru, et al., "Source Routing with Protocol-oblivious Forwarding (POF) to Enable Efficient e-Health Data Transfers," 2016 IEEE International Conference on Communications (ICC), May 22-27, 2016, 6 pages, IEEE, Kuala Lumpur, Malaysia.

Lin, Weidong, et al., "Using Path Label Routing in Wide Area Software-Defined Networks with Open Flow," 2016 International Conference on Networking and Network Applications, Jul. 2016, 6 pages, IEEE.

Long, Feng, "Research and Application of Cloud Storage Technology in University Information Service," Chinese Excellent Masters' Theses Full-text Database, Mar. 2013, 72 pages, China Academic Journals Electronic Publishing House, China.

Michael, Nithin, et al., "HALO: Hop-by-Hop Adaptive Link-State Optimal Routing," IEEE/ACM Transactions on Networking, Dec. 2015, 14 pages, vol. 23, No. 6, IEEE.

Ming, Gao, et al., "A Design of SD-WAN-Oriented Wide Area Network Access," 2020 International Conference on Computer Communication and Network Security (CCNS), Aug. 21-23, 2020, 4 pages, IEEE, Xi'an, China.

Mishra, Mayank, et al., "Managing Network Reservation for Tenants in Oversubscribed Clouds," 2013 IEEE 21st International Symposium on Modelling, Analysis and Simulation of Computer and Telecommunication Systems, Aug. 14-16, 2013, 10 pages, IEEE, San Francisco, CA, USA.

Mudigonda, Jayaram, et al., "NetLord: A Scalable Multi-Tenant Network Architecture for Virtualized Datacenters," Proceedings of the ACM SIGCOMM 2011 Conference, Aug. 15-19, 2011, 12 pages, ACM, Toronto, Canada.

Non-Published Commonly Owned U.S. Appl. No. 18/102,685, filed Jan. 28, 2023, 124 pages, VMware, Inc.

Non-Published Commonly Owned U.S. Appl. No. 18/102,687, filed Jan. 28, 2023, 172 pages, VMware, Inc.

Non-Published Commonly Owned U.S. Appl. No. 18/102,688, filed Jan. 28, 2023, 49 pages. VMware, Inc.

Non-Published Commonly Owned U.S. Appl. No. 18/102,689, filed Jan. 28, 2023, 46 pages, VMware, Inc.

Non-Published Commonly Owned U.S. Appl. No. 15/803,964, filed Nov. 6, 2017, 15 pages, The Mode Group.

Noormohammadpour, Mohammad, et al., "DCRoute: Speeding up Inter-Datacenter Traffic Allocation while Guaranteeing Deadlines," 2016 IEEE 23rd International Conference on High Performance Computing (HiPC), Dec. 19-22, 2016, 9 pages, IEEE, Hyderabad, India.

(56) References Cited

OTHER PUBLICATIONS

PCT International Search Report and Written Opinion of Commonly Owned International Patent Application PCT/US2021/065168, mailed May 6, 2022, 18 pages, International Searching Authority (EPO).
Ray, Saikat, et al., "Always Acyclic Distributed Path Computation," University of Pennsylvania Department of Electrical and Systems Engineering Technical Report, May 2008, 16 pages, University of Pennsylvania ScholarlyCommons.
Sarhan, Soliman Abd Elmonsef, et al., "Data Inspection in SDN Network," 2018 13th International Conference on Computer Engineering and Systems (ICCES), Dec. 18-19, 2018, 6 pages, IEEE, Cairo, Egypt.
Taleb, Tarik, "D4.1 Mobile Network Cloud Component Design," Mobile Cloud Networking, Nov. 8, 2013, 210 pages, MobileCloud Networking Consortium, retrieved from http://www.mobile-cloud-networking.eu/site/index.php?process=download&id=127&code=89d30565cd2ce087d3f8e95f9ad683066510a61f.
Tootaghaj, Diman Zad, et al., "Homa: An Efficient Topology and Route Management Approach in SD-WAN Overlays," IEEE INFOCOM 2020—IEEE Conference on Computer Communications, Jul. 6-9, 2020, 10 pages, IEEE, Toronto, ON, Canada.
Valtulina, Luca, "Seamless Distributed Mobility Management (DMM) Solution in Cloud Based LTE Systems," Master Thesis, Nov. 2013, 168 pages, University of Twente, retrieved from http://essay.utwente.nl/64411/1/Luca_Valtulina_MSc_Report_final.pdf.
Webb, Kevin C., et al., "Blender: Upgrading Tenant-Based Data Center Networking," 2014 ACM/IEEE Symposium on Architectures for Networking and Communications Systems (ANCS), Oct. 20-21, 2014, 11 pages, IEEE, Marina del Rey, CA, USA.
Xie, Junfeng, et al., A Survey of Machine Learning Techniques Applied to Software Defined Networking (SDN): Research Issues and Challenges, IEEE Communications Surveys & Tutorials, Aug. 23, 2018, 38 pages, vol. 21, Issue 1, IEEE.
Yap, Kok-Kiong, et al., "Taking the Edge off with Espresso: Scale, Reliability and Programmability for Global Internet Peering," SIGCOMM '17: Proceedings of the Conference of the ACM Special Interest Group on Data Communication, Aug. 21-25, 2017, 14 pages, Los Angeles, CA.
Zakurdaev, Gieorgi, et al., "Dynamic On-Demand Virtual Extensible LAN Tunnels via Software-Defined Wide Area Networks," 2022 IEEE 12th Annual Computing and Communication Workshop and Conference, Jan. 26-29, 2022, 6 pages, IEEE, Las Vegas, NV, USA.
Funabiki, Nobuo, et al., "A Frame Aggregation Extension of Routing Algorithm for Wireless Mesh Networks," 2014 Second International Symposium on Computing and Networking, Dec. 10-12, 2014, 5 pages, IEEE, Shizuoka, Japan.
Non-Published Commonly Owned U.S. Appl. No. 18/197,090, filed May 14, 2023, 36 pages, Nicira, Inc.
Non-Published Commonly Owned U.S. Appl. No. 18/222,864, filed Jul. 17, 2023, 350 pages, VMware, Inc.
Non-Published Commonly Owned U.S. Appl. No. 18/222,868, filed Jul. 17, 2023, 22 pages, VMware, Inc.
Non-Published Commonly Owned U.S. Appl. No. 18/224,466, filed Jul. 20, 2023, 56 pages, VMware, Inc.
Non-Published Commonly Owned U.S. Appl. No. 18/235,879, filed Aug. 20, 2023, 173 pages, VMware, Inc.

* cited by examiner

1100
E1 - C1
1110
L - C1
L - C3
H - C1
L - C7
E4 - C1
1116
G - C1

1100
E1 - C1
1110
L - C1
G - C1
L - C4
L - C8
E4 - C1
1116
E5 - H - C1

1100
E2 - H - C1
L - C2
L - C5
H - C1
L - C7
E4 - C1
1110
E1 - C1
1116

1100
E2 - H - C1
L - C2
L - C6
E4 - C1
1110
E1 - C1
L - C8
1116
G - C1
L - C4
E5 - H - C1

1100
E4 - C1
E1 - C1
1110
L - C9
L - C10
E3 - H - C1
L - C4
L - C8
1116
E5 - H - C1

ON DEMAND ROUTING MESH FOR ROUTING PACKETS THROUGH SD-WAN EDGE FORWARDING NODES IN AN SD-WAN

CLAIM OF BENEFIT TO PRIOR APPLICATIONS

This application is a continuation application of U.S. patent application Ser. No. 17/351,327, filed Jun. 18, 2021, now published as U.S. Patent Publication 2022/0353171. U.S. patent application Ser. No. 17/351,327 claims the benefit of Indian Provisional Patent Application 20/214, 1020149, filed May 3, 2021. U.S. patent application Ser. No. 17/351,327, now published as U.S. Patent Publication 2022/0353171, is incorporated herein by reference.

BACKGROUND

Today, software defined wide area networks (SD-WANs) provide secure access to applications hosted on clouds as well as enterprise datacenters. Typical SD-WAN deployments require a transit node through which the application flows in order to reach destinations (e.g., a cloud application involves branch-to-branch flows via gateways). However, certain challenges arise when handling critical application traffic, such as path impairments between source edge nodes and transit nodes, which can lead to application degradation. Additionally, critical applications that are of SOS nature are also subject to path instabilities and can end up with black out or brown out scenarios that lead to undesirable outcomes.

BRIEF SUMMARY

Some embodiments of the invention provide a method of routing packets through a software-defined wide area network (SD-WAN) defined for an entity. A first edge forwarding node, located at a first multi-machine site of the entity that is located at a first physical location and includes a first set of machines, serves as an edge forwarding node for the first set of machines by forwarding packets between the first set of machines and other machines associated with the entity via other forwarding nodes in the SD-WAN. The first edge forwarding node receives configuration data specifying for the first edge forwarding node to serve as a hub forwarding node for forwarding a set of packets from a second set of machines associated with the entity and operating at a second multi-machine site at a second physical location to a third set of machines associated with the entity and operating at a third multi-machine site at a third physical location. The first edge forwarding node then serves as a hub forwarding node to forward the set of packets to the third set of machines at the third multi-machine site.

In some embodiments, the first edge forwarding node receives the set of packets from the second edge forwarding node through a first tunnel between the first and second edge forwarding nodes, and forwards the packets to their next hop on their way to their destination via a second tunnel between the first edge forwarding node and the next hop. Before forwarding the set of packets through the second tunnel, in some embodiments, the first edge forwarding node removes a first tunnel header identified associated with the first tunnel and inserts a second tunnel header identifier associated with the second tunnel. In some embodiments, the first and second tunnels are secure tunnels (e.g., virtual private network (VPN) tunnels).

In some embodiments, the configuration data is received by the first edge forwarding node from a controller of the SD-WAN. The controller in some embodiments is a centralized controller, while in other embodiments it is a distributed controller with controller agents executing on devices in the SD-WAN (e.g., on the forwarding nodes), while in still other embodiments, the controller is a cloud gateway that performs the functionalities of a controller. Also, in some embodiments, the controller and the cloud gateway share controller functionalities.

The configuration data in some embodiments includes route records specifying multiple sets of routes in which the first edge forwarding node serves as just and edge forwarding element for the first multi-machine site and in which the first edge forwarding node serves as a hub forwarding element for other multi-machine sites, such as the second multi-machine site. In some embodiments, the controller provides different route records specifying different subsets of routes to different edge forwarding nodes in the SD-WAN.

The route records, in some embodiments, are generated by the controller based on routes identified in a routing graph (e.g., a routing-mesh topology model) generated by the controller that shows connections between forwarding nodes in the SD-WAN. In some embodiments, the controller uses the generated routing graph to identify edge forwarding nodes that can serve as hub forwarding nodes for the SD-WAN in order to provide alternate routes between source and destination forwarding nodes when the source forwarding nodes experience certain conditions while forwarding packets to other sites. For example, a particular forwarding node may be unable to connect to a hub forwarding node due to link degradation, congestion at the hub forwarding node because of another tenant, etc., according to some embodiments. In another example, the controller (or cloud gateway) in some embodiments can detect these conditions by pinging (e.g., sending ICMP messages) a hub forwarding node or set of hub forwarding nodes and detecting a slow response. In some embodiments, the controller provides the route records to the edge forwarding nodes proactively in order to allow the edge forwarding nodes to quickly react when experiencing the certain conditions. Alternatively, or conjunctively, the controller in some embodiments provides the route records reactively after detecting (e.g., by receiving a notification from the forwarding nodes) that a particular forwarding node is experiencing the certain conditions.

The conditions, in some embodiments, relate to a degraded operating state of hub forwarding nodes (i.e., transit nodes) and are associated with specified threshold values. In some embodiments, the degraded operating state of a hub forwarding node is caused by degradation of performance attributes such as latency, bandwidth, and throughput. The conditions and their associated threshold values are defined as policy-based routing (PBR) rules that are distributed to the forwarding nodes by the controller, according to some embodiments. In some embodiments, the forwarding nodes include metric generators for generating metrics to resolve these PBR rules and select alternate routes.

In some embodiments, each edge forwarding node in the SD-WAN is associated with a set of SD-WAN profiles that each identify shared sets of parameters. For example, an SD-WAN profile can identify a shared set of security parameters, service parameters, and/or policy parameters, in some embodiments. The controller, in some embodiments, uses these SD-WAN profiles while performing path searches on the routing graph to identify edge forwarding nodes in the routing graph that can serve in a secondary role as a hub forwarding node for the SD-WAN.

In some embodiments, the controller uses the routing graph to compute costs associated with multiple different paths through the routing graph. The computed costs, in some embodiments are link weight scores (i.e., cost scores) computed for different links between forwarding nodes in the routing graph. The weight scores, in some embodiments, are computed as weighted combinations of several computed and provide-specific values, such as a link's (1) computed delay value, (2) computed loss value, (3) provider network-connection cost, and (4) provider compute cost. In some embodiments, different links can have more than one associated cost. For example, the link cost associated with using an edge forwarding node in its primary role as an edge forwarding node is less than the link cost associated with using the edge forwarding node in its secondary role as a hub forwarding node, in some embodiments. The PBR rules used by the forwarding nodes are defined based on the computed weight scores, according to some embodiments (e.g., when latency is greater than N ms, use higher cost link).

The routing graph, in some embodiments, is a set of routing graphs that includes at least a first routing graph that does not include a direct link between the particular edge forwarding node and any edge forwarding node in a group of edge forwarding nodes associated with the entity, and at least a second routing graph that does include direct links between these edge forwarding nodes. In some embodiments, in order to identify edge forwarding nodes that can serve as hub forwarding nodes for the SD-WAN, the controller determines which routing graph results in better routing metrics than each of the other routing graphs in the set.

In some embodiments, in order to serve as a hub forwarding node to send the set of packets from the second set of machines to the third set of machines, the first edge forwarding node receives the packets from a second edge forwarding node of the second site through a first tunnel established between the first and second sites, and forwards the packets to a third edge forwarding node at the third site through a second tunnel between the first and third sites. In some embodiments, prior to forwarding the packets through the second tunnel, the first edge forwarding node removes from the packets a first tunnel header identifier associated with the first tunnel, inserts a second tunnel header identifier that is associated with the second tunnel, and forwards the packets to the third edge forwarding node.

The first edge forwarding node, in some embodiments, serves as the hub forwarding node for only a temporary period of time in order to forward the set of packets. In some embodiments, the first edge forwarding node does not continue to serve as a hub forwarding node for other communication sessions between the second and third sets of machines at the second and third sites, while in other embodiments, the first edge forwarding node serves as a hub forwarding node for all or some communication sessions between the second and third sites, as well as for potentially other sites of the entity.

In some embodiments, the first, second, and third edge forwarding nodes serve as spoke nodes in a hub-spoke architecture that uses a designated hub forwarding node located at a datacenter site associated with the entity. Accordingly, after the first edge forwarding node starts to operate as a hub forwarding node for the second site, in some embodiments, the SD-WAN has two hubs that include the first hub at the first multi-machine site (e.g., also referred to herein as a multi-user compute site) for the second multi-machine site and the second hub at the datacenter site for multiple edge forwarding nodes at multiple multi-machine sites of the entity. In some embodiments, the first edge forwarding node serves as hub forwarding node for a particular multi-machine site of the entity that establishes multiple tunnels with the first edge forwarding node, each tunnel used for a communication session between a machine at the particular multi-machine site and a machine at another multi-machine site of the entity.

The first multi-machine site of the entity, in some embodiments, is a first branch site of multiple branch sites of the entity, in some embodiments, and the first physical location is one of multiple geographically dispersed physical locations. Branch sites (e.g., multi-user compute sites), in some embodiments, are locations that have multiple user computes and/or other user-operated devices and serve as source computers and devices for communicating with other computers and devices at other sites (e.g., other branch sites, datacenter sites, etc.). The branch sites, in some embodiments, can also include servers that are not operated by users. In some embodiments, the second multi-machine site is a multi-tenant datacenter, such as a Software as a Service (SaaS) provider's datacenter. When the multi-tenant datacenter is a SaaS provider's datacenter, in some embodiments, the second edge forwarding node is a multi-tenant gateway forwarding node.

In some embodiments, the edge forwarding nodes associated with the SD-WAN can include an edge forwarding node associated with a branch site of the SD-WAN, a gateway forwarding node for a private datacenter, a multi-tenant gateway forwarding node associated with a public cloud, a multi-tenant gateway forwarding node associated with a SaaS provider cloud, and a hub forwarding node that provides connectivity between spoke edge forwarding nodes in the hub-and-spoke configuration of the SD-WAN.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF FIGURES

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method of routing packets through a software-defined wide area network (SD-WAN) defined for an entity by augmenting the roles of SD-WAN devices. Examples of roles for SD-WAN devices include SD-WAN edge forwarding nodes, SD-WAN hub forwarding nodes, and SD-WAN gateway forwarding nodes. In some embodiments, an SD-WAN device's role can include a primary function and a secondary function, where the secondary function is either always there, or requested on demand. In some embodiments, these roles are based on context. For example, a controller or controller cluster in some embodiments can associate SD-WAN forwarding nodes with heuristic metrics, such as geolocation, number of paths to a hub, path metrics, etc.

In its primary function in its role as an edge forwarding node, for example, a first SD-WAN edge forwarding node that is located at a first multi-machine site (e.g., also referred to herein as a multi-user compute site) of an entity that is located at a first physical location and includes a first set of machines, can forward packets from the first set of machines operating at the first multi-machine site to other forwarding nodes in the SD-WAN for forwarding to other machines associated with the entity. Based on configuration data (i.e., route records) from the controller, the first SD-WAN edge forwarding node can subsequently operate in its secondary function as a hub for the second multi-machine site and relay the set of packets from the second set of machines operating at the second multi-machine site to a third set of machines associated with the entity.

Figure 1:
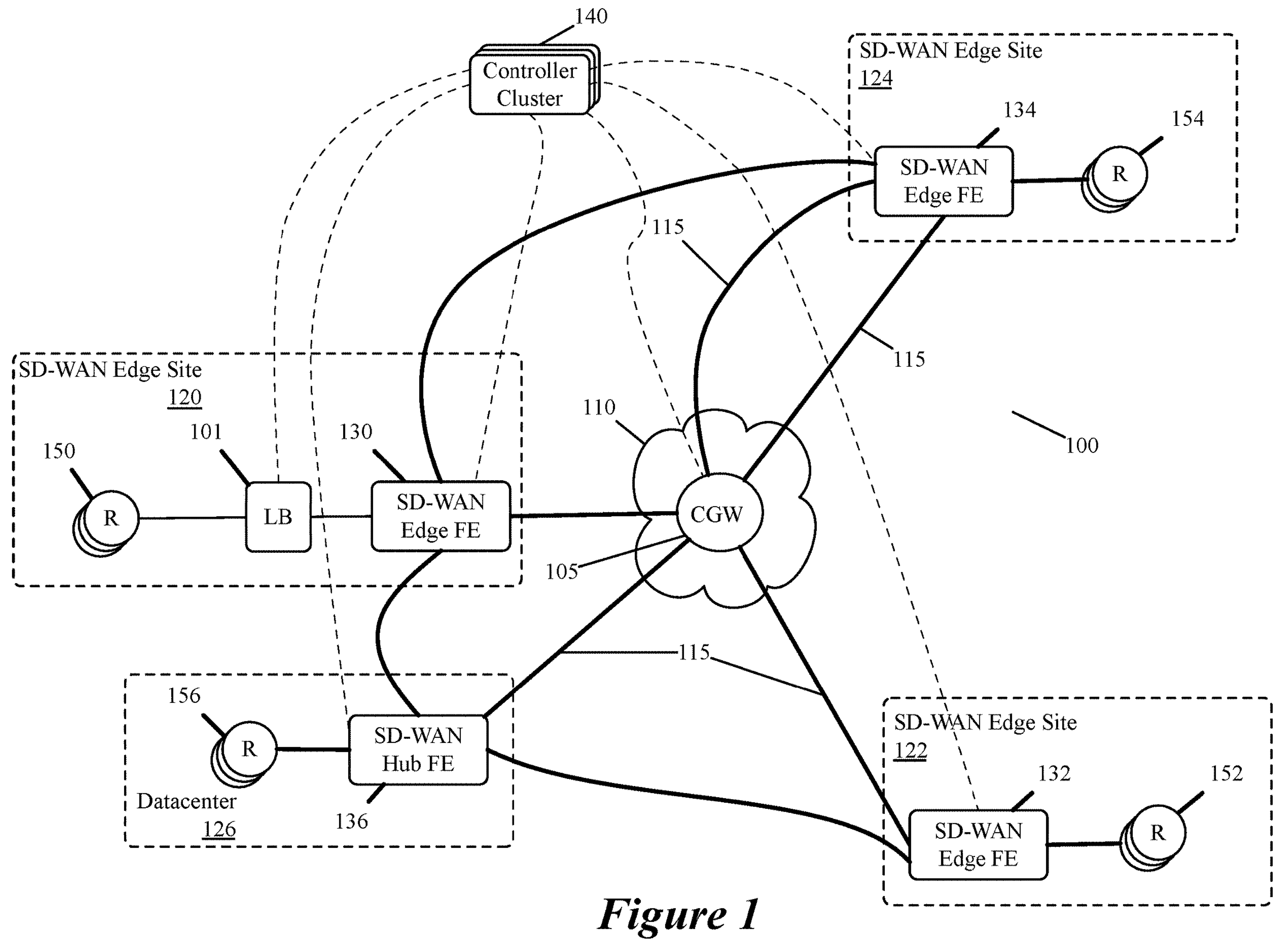
FIG. 1 illustrates an example of a virtual network that is created for a particular entity using a hub that is deployed in a public cloud datacenter of a public cloud provider, according to some embodiments.

FIG. 1 illustrates an example of a virtual network 100 that is created for a particular entity using SD-WAN forwarding elements deployed at branch sites, datacenters, and public clouds. Examples of public clouds are public clouds provided by Amazon Web Services (AWS), Google Cloud Platform (GCP), Microsoft Azure, etc., while examples of entities include a company (e.g., corporation, partnership, etc.), an organization (e.g., a school, a non-profit, a government entity, etc.), etc.

In FIG. 1, the SD-WAN forwarding elements include cloud gateway 105 and SD-WAN forwarding elements 130, 132, 134, 136. The cloud gateway (CGW) in some embodiments is a forwarding element that is in a private or public datacenter 110. The CGW 105 in some embodiments has secure connection links (e.g., tunnels) with edge forwarding elements (e.g., SD-WAN edge forwarding elements (FEs) 130, 132, 134, and 136) at the particular entity's multi-machine sites (e.g., SD-WAN edge sites 120, 122, and 124), such as multi-user compute sites (e.g., branch offices or other physical locations having multi user computers and other user-operated devices and serving as source computers and devices for requests to other machines at other sites), datacenters (e.g., locations housing servers), etc. These multi-machine sites are often at different physical locations (e.g., different buildings, different cities, different states, etc.).

Four multi-machine sites 120-126 are illustrated in FIG. 1, with three of them being branch sites 120-124, and one being a datacenter 126. Each branch site is shown to include an edge forwarding node 130-134, while the datacenter site 126 is shown to include a hub forwarding node 136. The datacenter SD-WAN forwarding node 136 is referred to as a hub node because in some embodiments this forwarding node can be used to connect to other edge forwarding nodes of the branch sites 120-124. The hub node in some embodiments uses or has one or more service engines to perform services (e.g., middlebox services) on packets that it forwards from one branch site to another branch site. In some embodiments, when an edge forwarding node takes on the role of a hub forwarding node (e.g., based on route records provided by the controller cluster), the controller cluster provides service rules to the edge forwarding node to enable this node, or a service engine used by this node, to perform service operations that are to be performed by the hub forwarding node. The hub node also provides access to the datacenter resources 156, as further described below.

Each edge forwarding element (e.g., SD-WAN edge FEs 130-134) exchanges packets with one or more cloud gateways 105 through one or more connection links 115 (e.g., multiple connection links available at the edge forwarding element). In some embodiments, these connection links include secure and unsecure connection links, while in other embodiments they only include secure connection links. As shown by edge node 134 and gateway 105, multiple secure connection links (e.g., multiple secure tunnels that are established over multiple physical links) can be established between one edge node and a gateway.

When multiple such links are defined between an edge node and a gateway, each secure connection link in some embodiments is associated with a different physical network link between the edge node and an external network. For instance, to access external networks, an edge node in some embodiments has one or more commercial broadband Internet links (e.g., a cable modem, a fiber optic link) to access the Internet, an MPLS (multiprotocol label switching) link to access external networks through an MPLS provider's network, a wireless cellular link (e.g., a 5G LTE network), etc. In some embodiments, the different physical links between the edge node 134 and the cloud gateway 105 are the same type of links (e.g., are different MPLS links).

In some embodiments, one edge forwarding node 130-134 can also have multiple direct links 115 (e.g., secure connection links established through multiple physical links) to another edge forwarding node 130-134, and/or to a datacenter hub node 136. Again, the different links in some embodiments can use different types of physical links or the same type of physical links. Also, in some embodiments, a first edge forwarding node of a first branch site can connect to a second edge forwarding node of a second branch site (1) directly through one or more links 115, (2) through a cloud gateway or datacenter hub to which the first edge forwarding node connects through two or more links 115, or (3) through another edge forwarding node of another branch site that can augment its role to that of a hub forwarding node, as will be described in more detail below. Hence, in some embodiments, a first edge forwarding node (e.g., 134) of a first branch site (e.g., 124) can use multiple SD-WAN links 115 to reach a second edge forwarding node (e.g., 130) of a second branch site (e.g., 120), or a hub forwarding node 136 of a datacenter site 126.

The cloud gateway 105 in some embodiments is used to connect two SD-WAN forwarding nodes 130-136 through at least two secure connection links 115 between the gateway 105 and the two forwarding elements at the two SD-WAN sites (e.g., branch sites 120-124 or datacenter site 126). In some embodiments, the cloud gateway 105 also provides network data from one multi-machine site to another multi-machine site (e.g., provides the accessible subnets of one site to another site). Like the cloud gateway 105, the hub forwarding element 136 of the datacenter 126 in some embodiments can be used to connect two SD-WAN forwarding nodes 130-134 of two branch sites through at least two secure connection links 115 between the hub 136 and the two forwarding elements at the two branch sites 120-124.

In some embodiments, each secure connection link between two SD-WAN forwarding nodes (i.e., CGW 105 and edge forwarding nodes 130-136) is formed as a VPN tunnel between the two forwarding nodes. In this example, the collection of the SD-WAN forwarding nodes (e.g., forwarding elements 130-136 and gateways 105) and the secure connections 115 between the forwarding nodes forms the virtual network 100 for the particular entity that spans at least the public or private cloud datacenter 110 to connect the branch and datacenter sites 120-126.

In some embodiments, secure connection links are defined between gateways in different public cloud datacenters to allow paths through the virtual network to traverse from one public cloud datacenter to another, while no such links are defined in other embodiments. Also, in some embodiments, the gateway 105 is a multi-tenant gateway that is used to define other virtual networks for other entities (e.g., other companies, organizations, etc.). Some such embodiments use tenant identifiers to create tunnels between a gateway and edge forwarding element of a particular entity, and then use tunnel identifiers of the created tunnels to allow the gateway to differentiate packet flows that it receives from edge forwarding elements of one entity from packet flows that it receives along other tunnels of other entities. In other embodiments, gateways are single-tenant and are specifically deployed to be used by just one entity.

FIG. 1 illustrates a cluster of controllers 140 that serve as a central point for managing (e.g., defining and modifying) configuration data that is provided to the edge nodes and/or gateways to configure some or all of the operations. In some embodiments, this controller cluster 140 is in one or more public cloud datacenters, while in other embodiments it is in one or more private datacenters. In some embodiments, the controller cluster 140 has a set of manager servers that define and modify the configuration data, and a set of controller servers that distribute the configuration data to the edge forwarding elements (FEs), hubs and/or gateways. In some embodiments, the controller cluster 140 directs edge forwarding elements and hubs to use certain gateways (i.e., assigns a gateway to the edge forwarding elements and hubs). In some embodiments, some or all of the controller cluster's functionality is performed by a cloud gateway (e.g., cloud gateway 105).

The controller cluster 140 also provides next hop forwarding rules and load balancing criteria in some embodiments. As mentioned above, the controller cluster 140 also provides service rules to edge forwarding nodes that can serve as hub forwarding nodes, in some embodiments, in order to enable these nodes, or service engines used by these nodes, to perform service operations on the packets that are to be performed by the hub forwarding node. In some embodiments, the controller cluster provides the configuration data (e.g., route records, forwarding rules, etc.) to the edge forwarding nodes proactively in order to allow the edge forwarding nodes to quickly react when experiencing certain conditions that necessitate using alternate routes. Alternatively, or conjunctively, the controller in some embodiments provides the configuration data reactively after detecting (e.g., by receiving a notification from the forwarding nodes) that a particular forwarding node is experiencing the certain conditions.

The conditions, in some embodiments, relate to degraded operational states of hub forwarding nodes and are associated with threshold values defined in the forwarding rules (e.g., policy-based routing (PBR) rules). In some embodiments, the degraded operational states of hub forwarding nodes can be due to issues with latency, bandwidth, and/or throughput. For example, a forwarding rule may specify that a first edge forwarding node at a first site should use a second edge forwarding node at a second site to forwarding a set of packets to a third site when the throughput of a designated hub forwarding node used by the first edge forwarding node does not fall within a threshold value range defined in the forwarding rule.

In some embodiments, the controller detects the degraded operational state of the hub forwarding node and signals to the first edge forwarding node to use an alternate route through the second edge forwarding node, while in other embodiments, the first edge forwarding node automatically uses the second edge forwarding node as a hub according to the route records. FIGS. 3, 4, 6, 8, and 10 illustrate processes for facilitating routing by designating edge forwarding nodes as hub forwarding nodes in some embodiments, and will be described below with reference to FIGS. 2, 5, 7, and 9.

Figure 2:
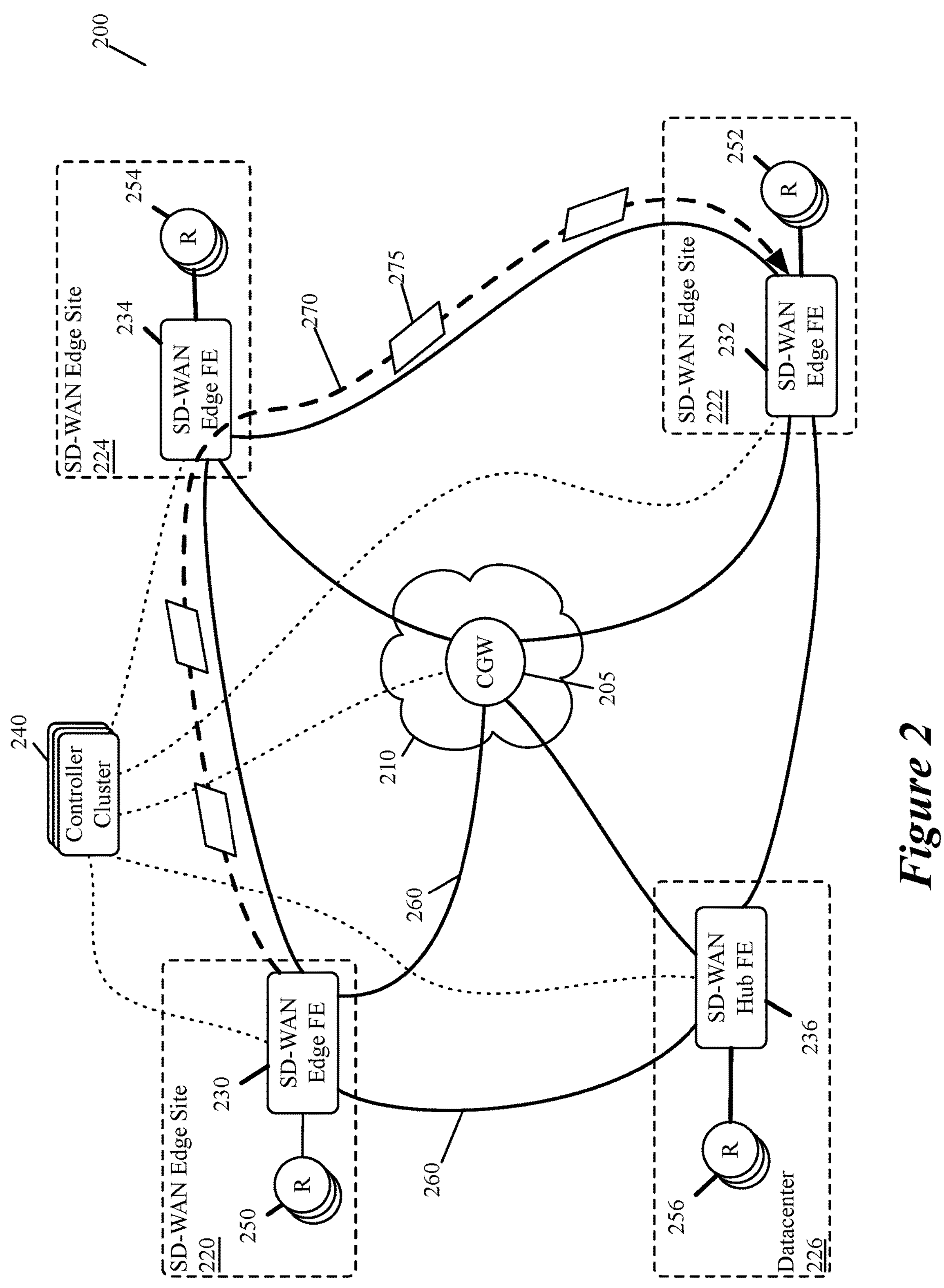
FIG. 2 illustrates an example of a virtual network in which a particular edge forwarding node has been designated as a hub forwarding node to facilitate a communications session between two edge forwarding nodes, according to some embodiments.

FIG. 2 illustrates another example of a virtual network 200 in some embodiments that is created for a particular entity using SD-WAN forwarding elements deployed at branch sites, datacenters, and public clouds. Like the virtual network 100, the SD-WAN forwarding elements of the virtual network 200 include SD-WAN edge forwarding nodes 230-234, cloud gateway 205, and SD-WAN hub forwarding node 236. The cloud gateway 205 in some embodiments is a forwarding element that is in a private or public datacenter 210. In some embodiments, the cloud gateway 205 has secure connection links (e.g., tunnels) with edge forwarding elements at the entity's different branch sites and datacenters. In this example, the edge forwarding nodes 230-234 are located at respective branch sites 220-224, while the hub forwarding node 236 is located at the datacenter 226.

While the cloud gateway 105 and hub forwarding node 236 can provide forwarding services for the branch sites 220-224, in some embodiments, these connections experience issues sometimes caused by heavy traffic loads coming from other sites in the SD-WAN. Accordingly, the edge forwarding nodes 230-234 in some embodiments are requested or instructed to serve as hub forwarding nodes to facilitate communication sessions between other sites in the SD-WAN.

Figure 3:
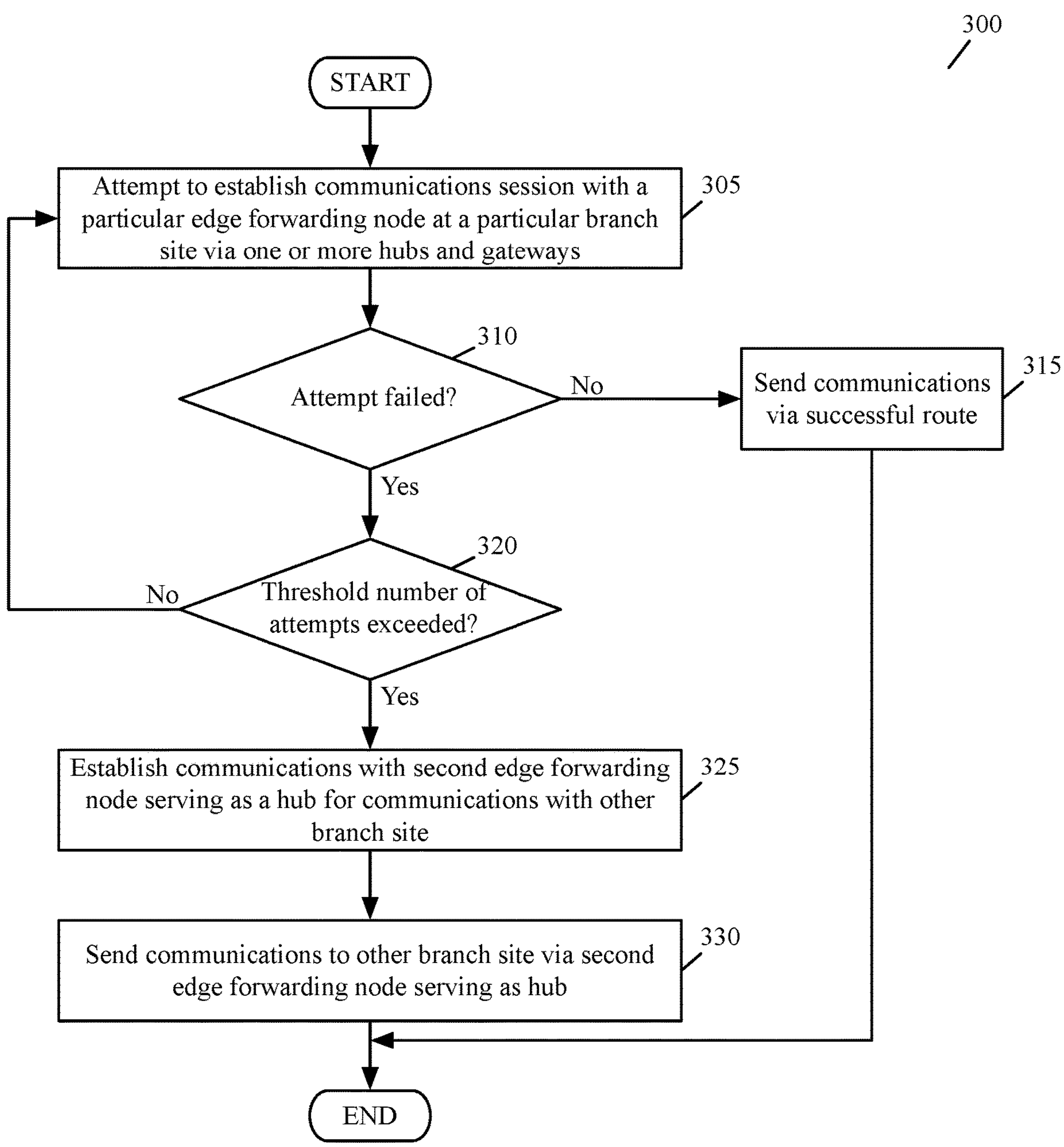
FIG. 3 illustrates a process performed by a forwarding node in a virtual network when attempting to establish a communications session with a particular destination, according to some embodiments.

FIG. 3 illustrates a process performed by an edge forwarding node at a branch site, in some embodiments, when attempting to establish communications with a destination (e.g., any destination device based on routing). The process 300 starts, at 305, by attempting to establish a communications session with a particular forwarding node at a particular site via one or more hubs or gateways. For example, in the virtual network 200, the edge forward node 230 at the branch site 220 can attempt to communicate with the edge forwarding node 232 at the branch site 222 through the cloud gateway 205 and the hub forwarding node 236 via connection link 260.

Next, at 310, the edge forwarding node determines whether the attempt to establish the communications session failed. In some embodiments, for example, when a different branch site of the same or different entity/tenant is sending large amounts of data via the hub or gateway forwarding nodes, the connections (e.g., links) with other branch sites become less reliable (i.e., degraded). Also, in some embodiments, the attempts to connect fail because the hub or gateway forwarding nodes may be experiencing scheduled or unscheduled downtime (e.g., for maintenance).

When the edge forwarding node determines at 310 that the attempt did not fail, the process transitions to 315 to send communications (i.e., packets) via the successful route. The process then ends. Otherwise, when the edge forwarding node determines at 310 that the attempt did fail, the process transitions to 320 to determine whether a threshold number of attempts has been exceeded. In some embodiments, the threshold number of attempts is predefined by a user (e.g., network administrator), and implemented as a fault tolerance policy, or as a PBR rule, as will be described below for FIG. 4.

When the edge forwarding node determines that the threshold of failed attempts has not been exceeded, the process returns to 305 to continue to attempt to establish the communications session via hub and gateway forwarding nodes. Alternatively, when the edge forwarding node determines at 320 that the threshold number of failed attempts has been exceed, the process transitions to 325 to establish a communications session with an intervening edge forwarding node at another branch site. For example, the edge forwarding node 230 can establish a communications session with the edge forwarding node 234 serving as a hub for a communications session between the edge forwarding node 230 and the edge forwarding node 232.

Next, at 330, the edge forwarding node starts forwarding packets to the intervening edge forwarding node, which is now serving as a hub forwarding node, for delivery to the particular forwarding node at the particular site. For example, in the virtual network 200, the edge forwarding node 230 is shown sending packets 275 along the route 270, which passes through the edge forwarding node 234 for delivery to the edge forwarding node 232. The process then ends.

Figure 4:
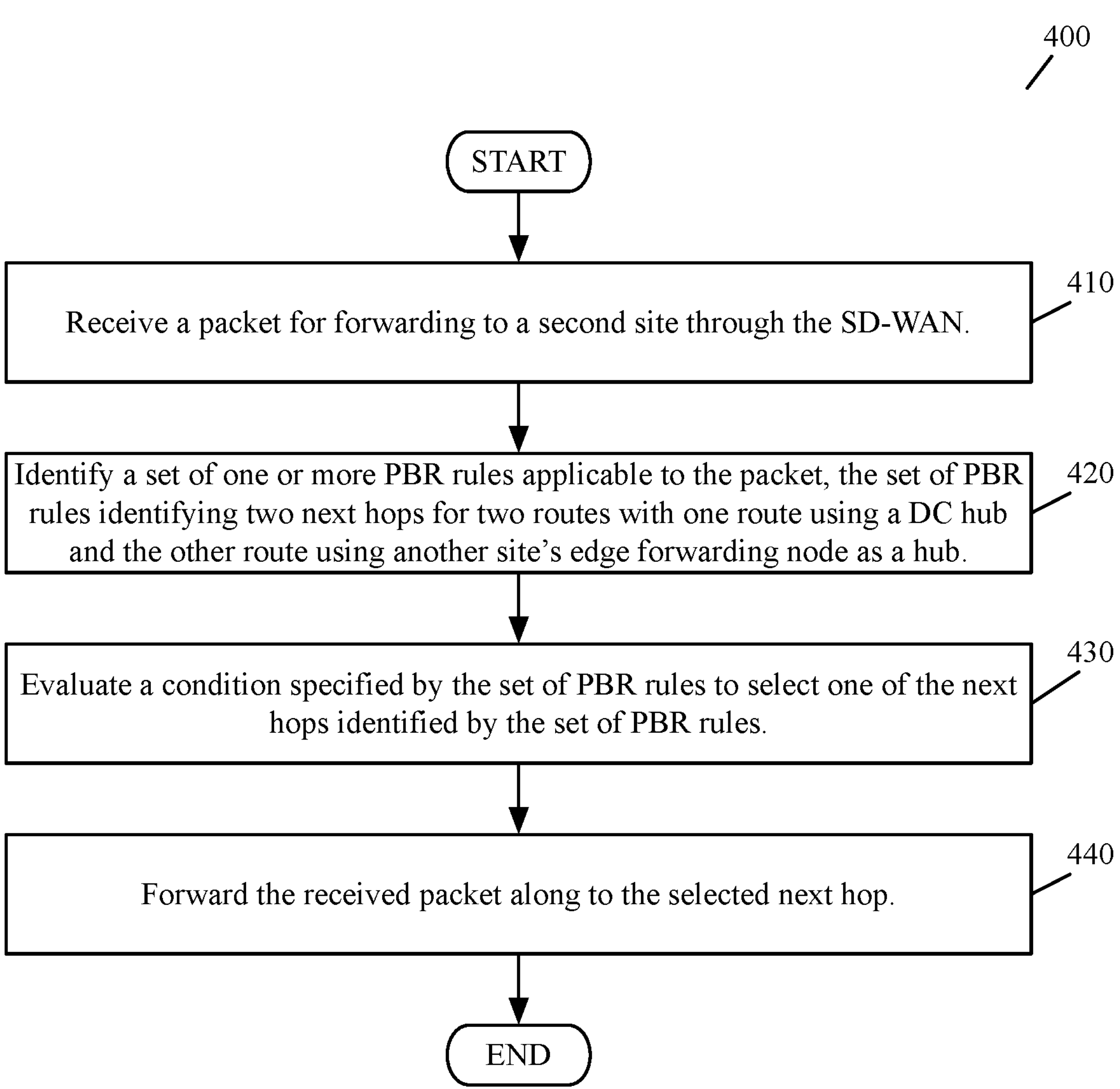
FIG. 4 illustrates a process performed by an edge forwarding node at a branch site, in some embodiments, when attempting to establish communications with a destination.

FIG. 4 illustrates another process performed by an edge forwarding node at a branch site, in some embodiments, when attempting to establish communications with a destination (e.g., any destination device based on routing). The process 400 starts, at 410, when the edge forwarding node of a branch site receives a packet (e.g., from a source machine at the branch site) for forwarding to a second site through the SD-WAN.

Next, the process identifies, at 420, a set of one or more PBR rules that are applicable to the packet and that identify two next hops for two routes to the destination, with one route using a designated hub forwarding node at a datacenter site and the other route using another edge forwarding node at another site. In some embodiments, the edge forwarding node identifies applicable PBR rules based on five tuple identifiers (e.g., source and destination address, source and destination port number, and protocol) associated with the packet, as well as based on performance attributes of the designated hub forwarding node (e.g., latency, bandwidth, and throughput).

After identifying the set of PBR rules, the process evaluates, at 430, a condition specified by the set of PBR rules to select one of the next hops identified by the set of PBR rules. For example, the PBR rules, in some embodiments, specify threshold values for the performance attributes. For example, a PBR rule may specify that when the designated hub forwarding node has a latency greater than N ms, the other edge forwarding node serving as a hub forwarding node should be the next hop for forwarding the packet. In another example, a PBR rule may specify that when the edge forwarding node experiences greater than N number of failed attempts to connect to the designated hub forwarding node, the other edge forwarding node serving as a hub forwarding node should be the next hop for forwarding the packet. The process then forwards, at 440, the received packet along to the selected next hop. Following 440, the process 400 ends.

Figure 5:
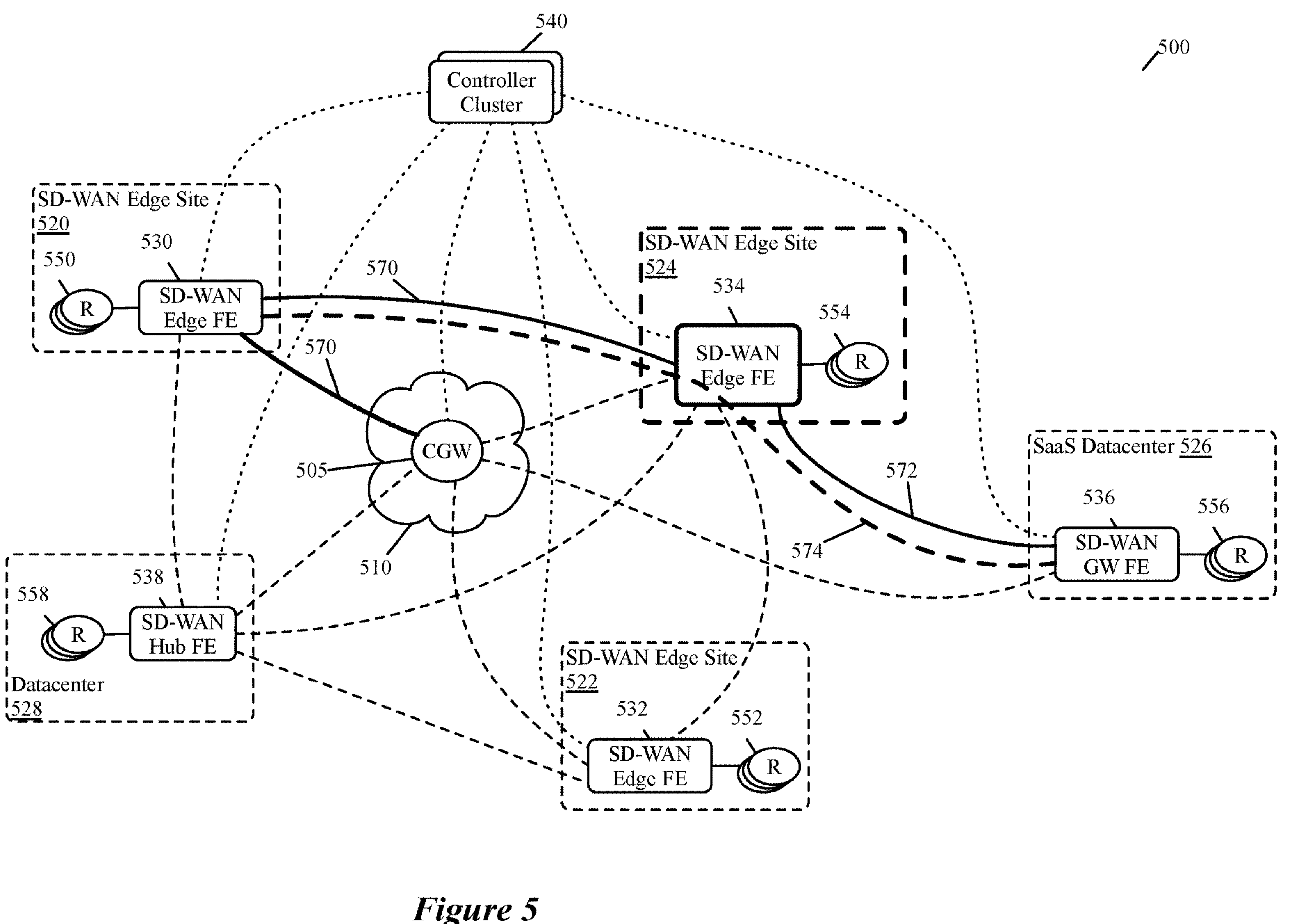
FIG. 5 illustrates an example of a virtual network in which a particular edge forwarding node has been designated as a hub forwarding node to facilitate a communications session between a particular edge forwarding node and a SaaS datacenter, according to some embodiments.

FIG. 5 illustrates a virtual network 500 that includes a controller cluster 540, multiple branch sites (e.g., 520, 522, and 524), each branch site having a respective SD-WAN edge forwarding node (e.g., 530, 532, and 534) and a set of resources (e.g., 550, 552, and 554). The virtual network 500 also includes a datacenter 528 (public or private) with resources 558 and an SD-WAN hub forwarding node 538, a cloud gateway 505 in a public cloud 510, and a SaaS datacenter 526 with resources 556 and an SD-WAN gateway forwarding node 536. FIG. 5 will be described below with reference to FIG. 6.

Figure 6:
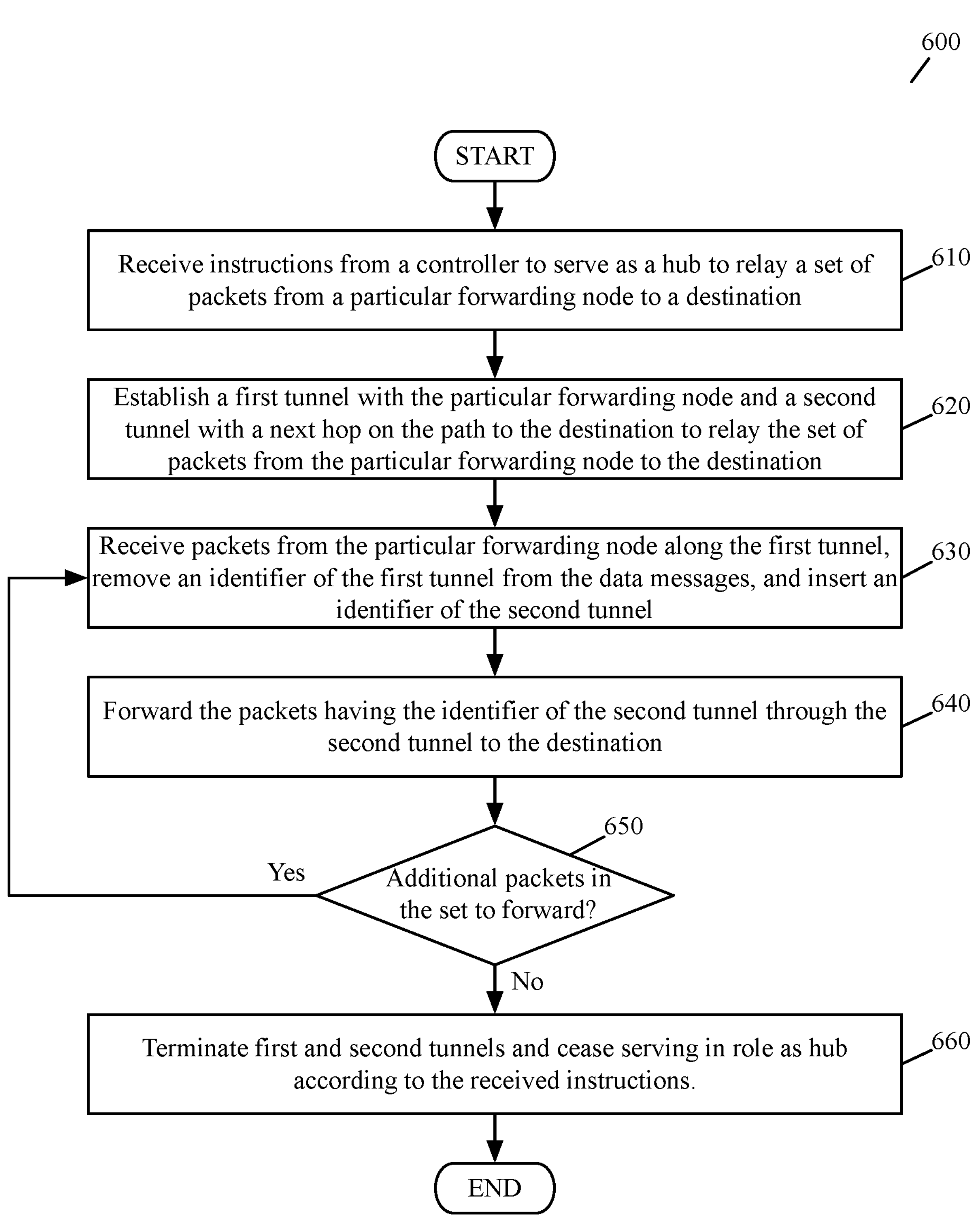
FIG. 6 illustrates a process performed by a forwarding node in a virtual network that acts as a hub forwarding node to facilitate a communications session between a particular source and a particular destination, according to some embodiments.

FIG. 6 illustrates a process 600 performed by an edge forwarding node of a branch site serving as a hub forwarding node to relay communications between other sites internal and external to the virtual network in some embodiments. The process 600 starts, at 610, when an edge forwarding node (i.e., a first edge forwarding node) of a branch site receives instructions from a controller to serve as a hub forwarding node to relay a set of packets from a particular forwarding node at a particular site to a destination. For example, in the virtual network 500, the edge forwarding node 530 at the branch site 520 can establish a communications session with the edge forwarding node 534 at the branch site 524 in order to have the edge forwarding node 534 serve as a hub for relaying a set of packets from the edge forwarding node 530 to the gateway forwarding node 536 following a number of failed attempts to communicate through the cloud gateway 505, in some embodiments. In some embodiments, the instructions include route records generated by the controller based on routes identified in one or more routing graphs for the SD-WAN.

Following receipt of the instructions at 610, the edge forwarding node establishes, at 620, a first tunnel with the particular forwarding node of the particular site and a second tunnel with a next hop on the path to the destination in order to relay the set of packets from the particular forwarding node to the destination. For example, the edge forwarding node 532 can establish a tunnel with the edge forwarding node 530 via the link 570, and a tunnel with the gateway forwarding node 536 (i.e., destination) on the link 572.

The edge forwarding node next receives, at 630, packets from the particular forwarding node along the first tunnel, removes an identifier of the first tunnel from the packets, and inserts an identifier of the second tunnel. The edge forwarding node then forwards, at 640, the packets having the identifier of the second tunnel through the second tunnel to the destination. For example, the edge forwarding node 534 can receive packets from the edge forwarding node 530 and forward the packets to the destination gateway forwarding node 536 along the path illustrated by the dashed line 574.

Next, at 650, the edge forwarding node determines whether there are additional packets in the set of packets to be forwarded. When the edge forwarding node determines that there are additional packets to forward in the communications session (i.e., the session has not yet terminated), the process returns to 630 to receive the packets from the particular forwarding node.

Otherwise, when the edge forwarding node determines there are no additional packets to forward (i.e., the communications session has terminated), the process transitions to 660 to terminate the first and second tunnels and cease serving in the role as a hub according to the received instructions. For example, in some embodiments, the edge forwarding node operating in a hub role is configured to only remain in that role as the hub for the length of time it takes to relay the set of packets for which the tunnel was initially established, while in other embodiments, the edge forwarding node continues to operate in the hub role for a particular set of communications sessions, or in still other embodiments, the edge forwarding node operates in the hub role until it receives additional instructions (e.g., from the controller) to stop. Following 660, the process ends.

Figure 7:
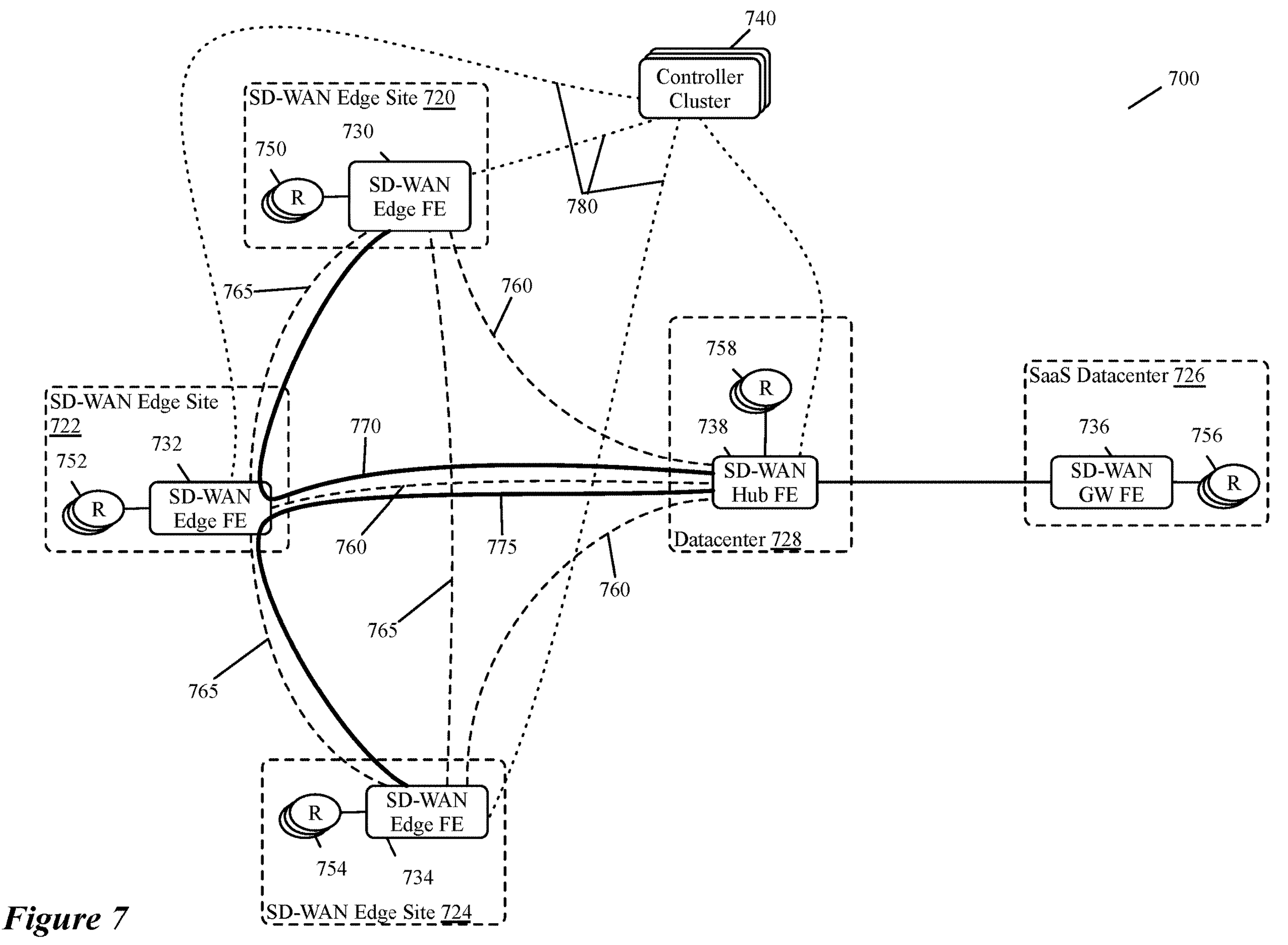
FIG. 7 illustrates an example of a virtual network in which a particular edge forwarding node has been designated as a hub forwarding node for other edge forwarding nodes in the virtual network, according to some embodiments.

FIG. 7 illustrates another example of a virtual network in some embodiments. The virtual network 700 includes a controller cluster 740, a set of branch sites (e.g., 720, 722, and 724) that each include a set of resources (e.g., 750, 752, and 754) and an SD-WAN edge forwarding node (e.g., 730, 732, and 734), and a datacenter 728 that includes resources 758 and a hub forwarding node 738. The hub forwarding node 738 at the datacenter 728 serves to connect each of the branch sites 720-724 to the gateway forwarding node 736 of the external SaaS datacenter 726 to allow the branch sites to access resources 756 of the SaaS datacenter. FIG. 7 will be described in further detail below with reference to FIG. 8.

Figure 8:
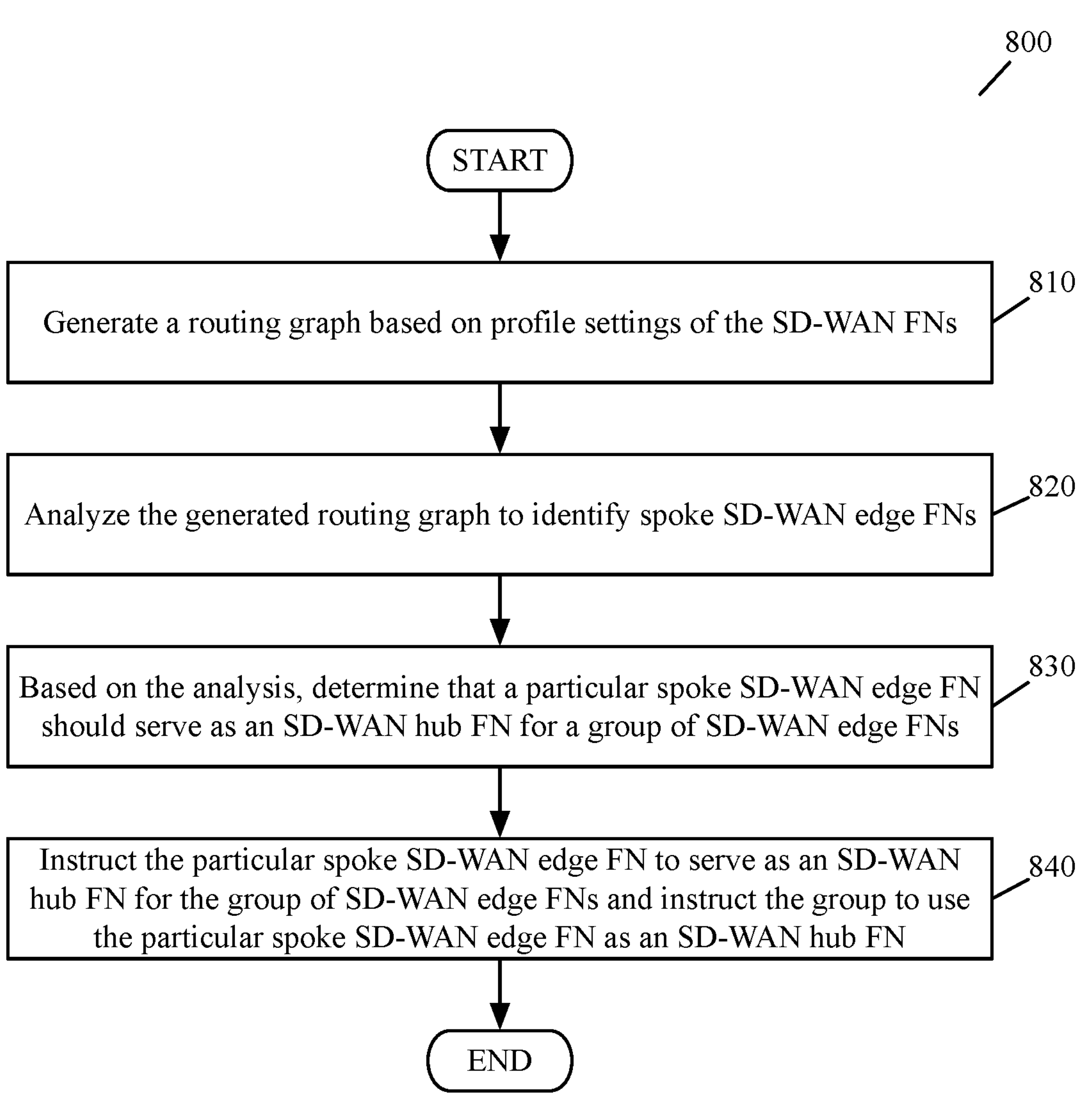
FIG. 8 illustrates a process performed by a controller or controller cluster in a virtual network to identify potential edge forwarding nodes able to serve as hub forwarding nodes to provide optimal routing for other forwarding nodes in the virtual network, according to some embodiments.

FIG. 8 illustrates a process performed by a controller or controller cluster in some embodiments. The process 800 is performed as a reactive process in some embodiments (i.e., in response to detection of poor conditions in the SD-WAN), while in other embodiments, the process is a proactive process (i.e., performed prior to any detection of poor conditions). The process 800 starts at 810 when the controller generates a routing graph (e.g., routing-mesh topology model) based on profile settings of SD-WAN forwarding nodes in order to identify available routes between devices in and out of the SD-WAN. For example, the controller cluster 740 may identify all of the connections 760 between the branch sites 720-724 and the datacenter 728, as well as the connections 765 between the branch sites. An example routing graph will be described below with reference to FIGS. 11A-11G.

Next, the controller analyzes, at 820, the routing graph to identify spoke SD-WAN edge forwarding nodes. In the virtual network 700, the controller cluster 740 may identify each of the edge forwarding nodes 730-734 as spokes around the hub forwarding node 738. Based on the analysis, the controller determines, at 830, that a particular spoke SD-WAN edge forwarding node should serve as an SD-WAN hub forwarding node for a group of SD-WAN edge forwarding nodes. For example, though each of the edge forwarding nodes 730-734 have been identified as spokes, the controller 740 in some embodiments may determine that the optimal route for the edge forwarding nodes 730 and 734 (e.g., in case these nodes are unable to reach the hub forwarding node 738 directly) would be through the edge forwarding node 732 as illustrated by the bold routes 770 and 775.

After determining that the particular spoke edge forwarding node should serve as a hub forwarding node for a group of edge forwarding nodes, the controller instructs, at 840, the particular spoke edge forwarding node to serve as a hub forwarding node for the group of SD-WAN edge forwarding nodes, and instructs the group to use the particular spoke edge forwarding node as a hub forwarding node. For example, the controller cluster 740 can use the connections 780 to send respective instructions to each of the edge forwarding nodes 730-734. In some embodiments, the controller instructs the group of edge forwarding nodes to use the designated hub forwarding node only for a specified amount of time (e.g., for a particular set of communications sessions).

The instructions, in some embodiments, include route records generated by the controller that identify different paths using the particular spoke edge forwarding node as a hub forwarding node. In some embodiments, the route records include two different sets of route records generated based on first and second routing graphs, with the first set including routes where the particular spoke edge forwarding node only serves as an edge forwarding node, and the second set including routes where the particular spoke edge forwarding node serves as an edge forwarding node and as a hub forwarding node. Alternatively, or conjunctively, the route records in some embodiments include two different sets of route records based one routing graph generated by the controller, with the first set of route records further based on a first set of routes associated with a first cost when using the particular spoke edge forwarding node as an edge forwarding node, and the second set of route records further based on a second set of routes associated with a second cost when using the particular spoke edge forwarding node as a hub forwarding node. In some embodiments, the controller also sends with the route records a list of nodes identified in the routing graph as nodes that can serve as hubs to the forwarding nodes in the SD-WAN. After providing the instructions to the particular spoke edge forwarding node, the process 800 ends.

Figure 9:
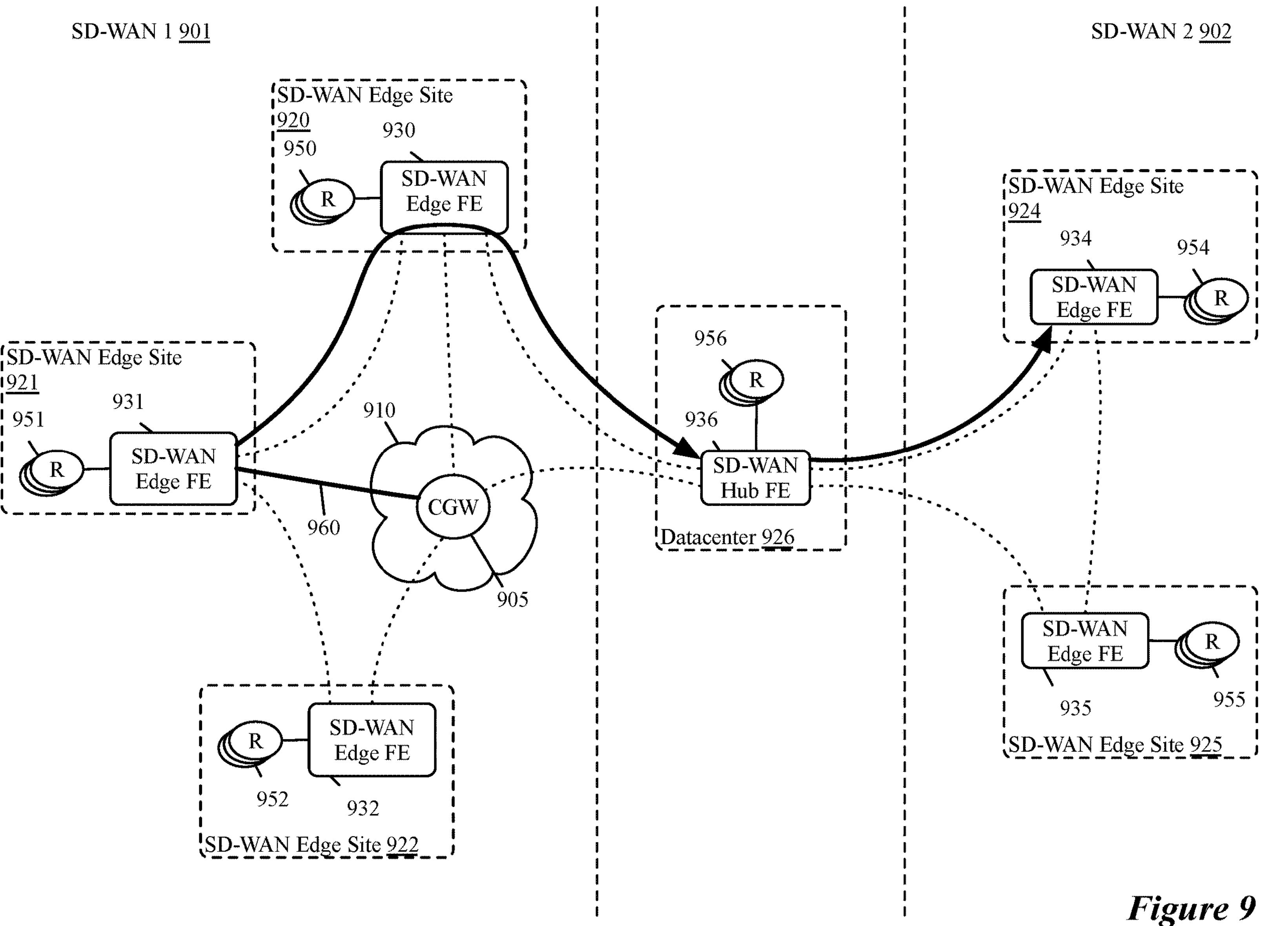
FIG. 9 illustrates an example in which a particular edge forwarding node in a first SD-WAN has been designated as a hub forwarding node to facilitate a communications session between another edge forwarding node in the first SD-WAN and an edge forwarding node in a second SD-WAN, according to some embodiments.

FIG. 9 illustrates an example of a communications session between sites in different SD-WANs that is relayed by an edge forwarding node. The first SD-WAN 901, includes a set of branch sites (e.g., 920, 921, and 922) each with a set of resources (e.g., 950, 951, and 952) and an edge forwarding node (e.g., 930, 931, and 932), as well as a cloud gateway 905 in a public cloud 910. The second SD-WAN 902 includes a pair of branch sites (e.g., 924 and 925) each with a set of resources (e.g., 954 and 955) and an edge forwarding node (e.g., 934 and 935). The first and second SD-WANs 901 and 902 are connected by a public datacenter 926 that includes a set of resources 956 and a hub forwarding node 936. FIG. 9 will be further described below with reference to FIG. 8.

Figure 10:
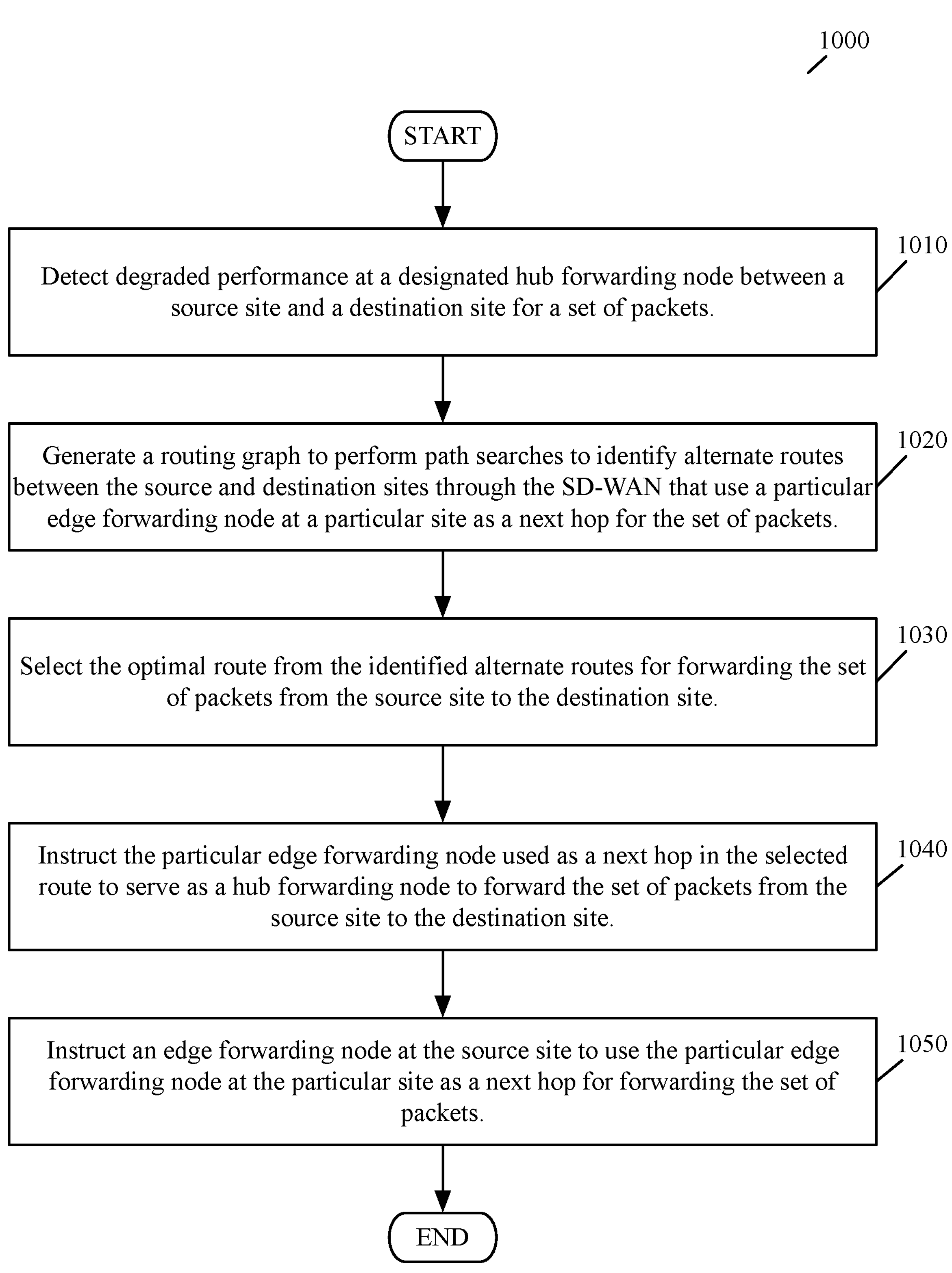
FIG. 10 illustrates a process performed by a controller or controller cluster in a virtual network to identify potential edge forwarding nodes able to serve as hub forwarding nodes to provide optimal routing for other forwarding nodes in the virtual network in response to detected failed communications attempts by another forwarding node in the virtual network, according to some embodiments.

FIG. 10 illustrates a process performed by a controller or controller cluster in some embodiments to facilitate routing between forwarding nodes internal and external to an SD-WAN. The process 1000 starts at 1010 when the controller detects degraded performance at a designated hub forwarding node between a source site and a destination site. For example, a controller cluster (not pictured) for the SD-WAN 901 may detect that the performance of the cloud gateway 905, and/or the link 960 between the edge forwarding node 931 and the cloud gateway 905, is degraded. In some embodiments, the controller cluster detects such network events by receiving notifications from the different forwarding elements (e.g., edge forwarding node 931, cloud gateway 905, etc.) regarding the network events.

Next, the controller generates, at 1020, a routing graph (i.e., the routing graph generated in the process 800) to perform path search to identify alternate routes between the source and destination sites through the SD-WAN that use a particular edge forwarding node at a particular site as a next hop (i.e., instead of the designated hub forwarding node) for the set of packets. For example, a controller cluster (not pictured) for the SD-WAN 901 may identify the edge forwarding node 930 as a spoke edge forwarding node able to serve as a hub for a communications session between the edge forwarding node 931 in the SD-WAN 901 and a destination, such as the edge forwarding node 934 of the branch site 924 in the SD-WAN 902.

The controller cluster then selects, at 1030, the optimal route from the identified alternate routes for forwarding the set of packets from the source site to the destination site. In some embodiments, each route has an associated cost, and the selected optimal route is the route having the lowest cost, while in other embodiments, the optimal route is not the route having the lowest cost.

The controller cluster instructs, at 1040, the particular edge forwarding node used as a next hop in the selected route to serve as a hub forwarding node to forward the set of packets from the source site to the destination site. For example, a controller cluster (not pictured) can instruct the edge forwarding node 930 to serve as a hub for the edge forwarding node 931 in order for the edge forwarding node 931 to forward the set of packets to the edge forwarding node 934 in the second SD-WAN 902, such that the packets are forwarded from the edge forwarding node 930 serving as a hub, to the hub forwarding node 936 of the datacenter 926, and finally to the edge forwarding node 934.

Additionally, the controller cluster instructs, at 1050, an edge forwarding node at the source site to use the particular edge forwarding node at the particular site as a next hop for forwarding the set of packets. In some embodiments, the controller cluster instructs the edge forwarding node to use the particular edge forwarding node as a next hop only for the set of packets, while in other embodiments, the controller cluster instructs the edge forwarding node to use the particular edge forwarding node as a next hop for additional sets of packets. The process then ends.

In some embodiments, the cloud gateway 905 performs some or all of the functionalities of the controller cluster described above. For example, in some embodiments, the cloud gateway is responsible for collecting network event-related data from other forwarding elements connected by the SD-WAN and provides this data to the controller cluster, while in other embodiments, the cloud gateway collects the data, analyzes the data to detect any problems, and provides solutions (e.g., by providing alternate routes for forwarding packets).

While the processes in FIGS. 3-10 are described with reference to the elements in FIGS. 2-9, the particular destination for each of these processes can be any of an SD-WAN edge forwarding node at a branch site, an SD-WAN gateway forwarding node for a private datacenter, a multi-tenant SD-WAN gateway forwarding node associated with a public cloud, a multi-tenant SD-WAN gateway forwarding node associated with a SaaS provider cloud, or an SD-WAN hub forwarding node that provides connectivity between spoke SD-WAN edge forwarding nodes in a hub-and-spoke configuration of the SD-WAN.

As mentioned above, the controller or controller cluster in some embodiments proactively or reactively creates and examines routing graphs in order to determine routes for packets between SD-WAN edge forwarding nodes. In some embodiments, the controller generates one or more routing graphs to perform path searches to identify routes through the SD-WAN forwarding nodes (e.g., edge nodes, hub nodes, cloud gateway nodes, etc.) between SD-WAN sites that are sources and destinations of packet flows. In some embodiments, the controller also provides a list of forwarding nodes that can be used as hub forwarding nodes to each forwarding node in the SD-WAN. Additional details regarding generating routing graphs and performing path searches on those routing graphs for identifying paths through the SD-WAN can be found in U.S. Pat. No. 11,005,684.

FIGS. 11A-11G illustrate an example of a routing graph generated by a controller, along with a subset of potential desirable paths transposed on the routing graph from which the controller can select one or more edge forwarding nodes to operate in a secondary function as hub forwarding nodes. While the routing graph generation and analyses are described below as being performed by the controller, some or all of these functionalities, in some embodiments, are instead performed by the cloud gateway.

Figures 11A, 11B:
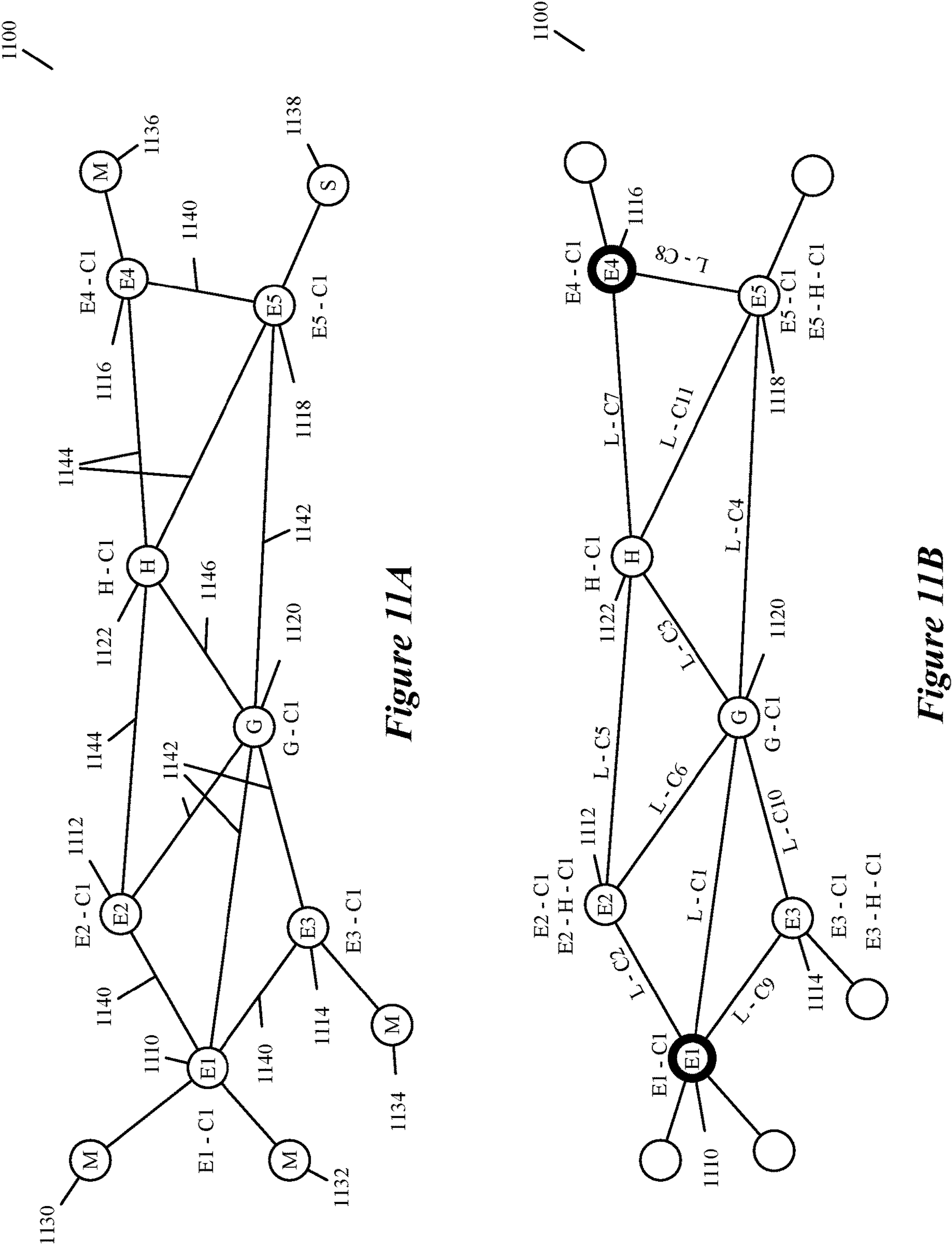
FIGS. 11A-11G illustrate an example of a routing graph generated by a controller to identify all possible routes between a source and destination, according to some embodiments.

FIG. 11A illustrates a routing graph 1100 generated by a controller to identify nodes in a virtual network and the connections between them. The routing graph 1100 includes five edge forwarding nodes (e.g., 1110, 1112, 1114, 1116, and 1118), a gateway forwarding node 1120, and a hub forwarding node 1122. Additionally, the routing graph includes a node 1138 representing an external corporate compute node (e.g., a branch office or datacenter) or SaaS provider accessible through edge forwarding node 1118, and a set of nodes 1130, 1132, 1134, and 1136 representing machines or groups of machines at branch sites served by the edge forwarding nodes 1110-1118. For example, the nodes 1130 and 1132 represent machines that are accessible through edge forwarding node 1110, node 1134 represents machines that are accessible through edge forwarding node 1114, and node 1136 represents machines that are accessible through edge forwarding node 1116.

The routing graph 1100 also illustrates the connections between these forwarding nodes, including links 1140 between edge forwarding nodes, links 1142 between edge forwarding nodes and the gateway forwarding node 1120, links 1144 between edge forwarding nodes and the hub forwarding node 1122, and a link 1146 between the gateway forwarding node 1120 and hub forwarding node 1122. In some embodiments, the controller removes any identified bad links before generating the routing graph 1100.

As described in relation to the process 800, the controller can analyze the routing graph to identify spoke SD-WAN edge forwarding nodes, such as spoke edge forwarding nodes 1110-1118, and determine whether any of the identified spoke edge forwarding nodes should serve as hub forwarding nodes for other edge forwarding nodes. For example, the edge forwarding node 1112 has a connection via a link 1144 to the hub forwarding node 1122, and thus the edge forwarding node 1112 can act as a hub forwarding node for the edge forwarding node 1110 if the connection link 1142 between edge forwarding node 1110 and gateway forwarding node 1120 becomes unreliable. Each node that exists as a hub or spoke in the routing graph 1100 is also illustrated with a cost label indicative of the cost of using each respective node in their primary role (e.g., edge forwarding node 1110 has an associated cost 1 ("E1-C1"), and edge forwarding node 1116 has an associated cost 1 ("E4-C1")).

In some embodiments, for one or more links in the routing graph, the controller computes a link weight score (cost score) as a weighted combination of several computed and provider-specific values. In some embodiments, the weight score is a weighted combination of the link's (1) computed delay value, (2) computed loss value, (3) provider network-connection cost, and (4) provider compute cost. In some embodiments, the provider compute cost is accounted for as the managed forwarding nodes connected by the link are machines (e.g., virtual machines or containers) that execute on host computers in the public cloud datacenter(s). These weight scores, in some embodiments, can be used to determine which edge forwarding nodes would be best suited to serve in their secondary function as hub forwarding nodes.

For example, FIG. 11B illustrates the routing graph 1100 with weight scores added to the links for use by the controller to determine the most desirable routes between a source node (e.g., emphasized edge forwarding node 1110) and a destination node (e.g., emphasized gateway forwarding node 1136). For example, the link between edge forwarding node 1110 and gateway forwarding node 1120 has a weight value of L-C1 (i.e., link cost 1), while the link between the edge forwarding node 1110 and the edge forwarding node 1112 has a weight value of L-C2 (i.e., link cost 2). It can be assumed, in some embodiments, that the cost of a link between an edge forwarding node and a designated gateway (e.g., L-C1) under normal conditions is less than the cost of a link between a first edge forwarding node and a second edge forwarding node that is operating in a hub forwarding node role (e.g. L-C2).

In addition to the weight values associated with each link, and the initial cost scores for each of the nodes, edge forwarding nodes 1112, 1114, and 1118 include secondary cost scores representative of the cost of using each of these particular edge forwarding nodes in their secondary functions as hub forwarding nodes (e.g., edge forwarding node 1112 includes a secondary cost E2-H-C1). In some embodiments, it can be assumed that an edge forwarding node's cost score for when the node is operating in its primary function as an edge forwarding node is less than the cost score for when the edge forwarding node is operating in its secondary function as a hub forwarding node. In some such embodiments, it can also be assumed that under normal operating conditions, the cost score for when the edge forwarding node is operating in its secondary function as a hub forwarding node is greater than the cost score associated with a designated hub forwarding node.

Figures 11C, 11D, 11E, 11F, 11G:
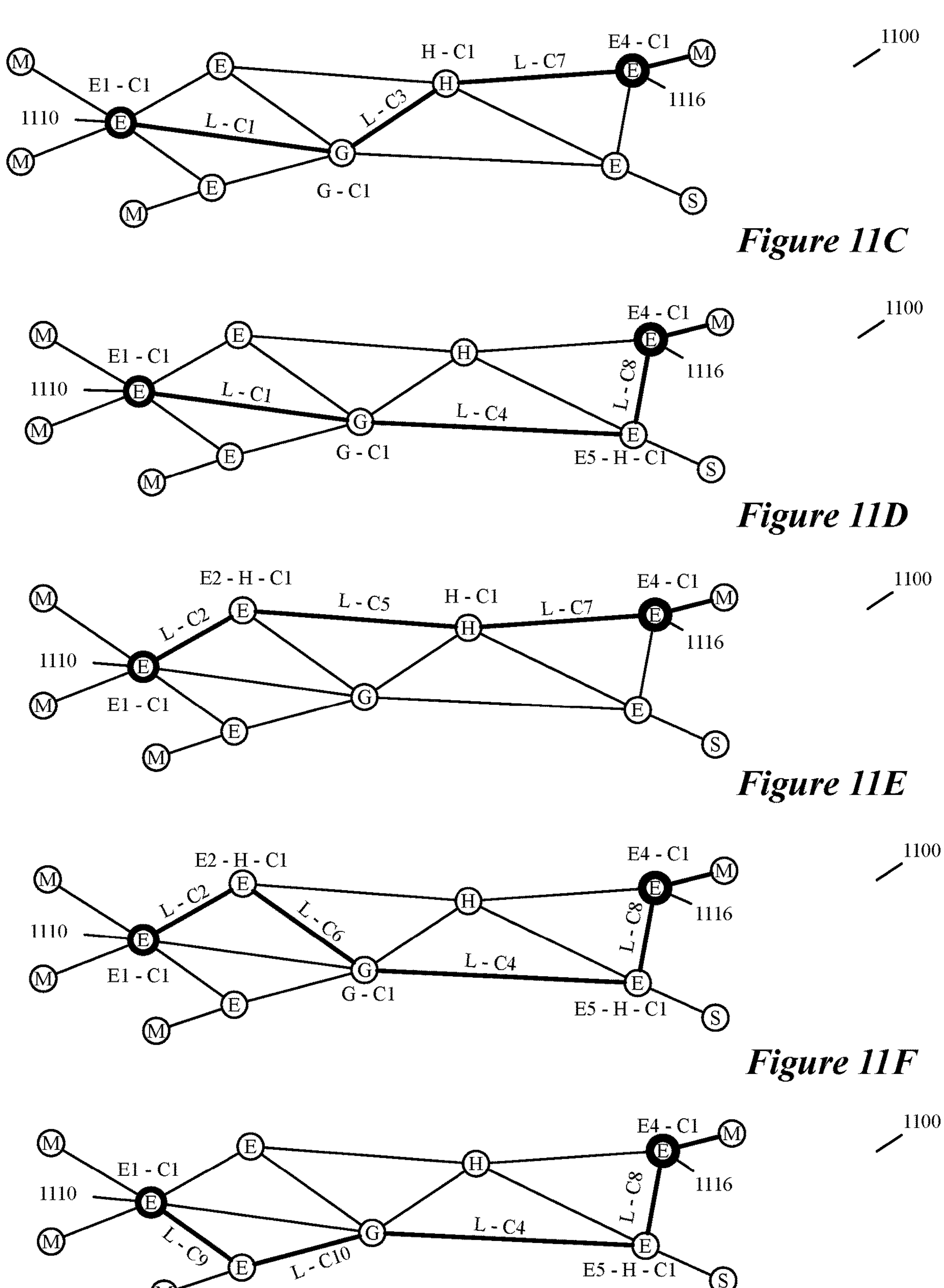

FIG. 11C illustrates the routing graph 1100 over which a first desirable path between the edge forwarding node 1110 and the edge forwarding node 1116 is transposed, represented by the emphasized and labeled links. In this example, each of the forwarding nodes through which traffic would traverse has a cost associated with the primary function of the forwarding node (i.e., none of the edge forwarding nodes in this example are operating as hub forwarding nodes). Thus, the cost of using this particular path is less than the cost of other potential paths, in some embodiments.

FIG. 11D illustrates the routing graph 1100 over which a second desirable path between the edge forwarding node 1110 and the edge forwarding node 1116 is transposed. In this example, one edge forwarding node (i.e., edge forwarding node 1118) is operating as a hub forwarding node in order to pass traffic from the gateway 1120 to the edge forwarding node 1116.

The decision to augment the role of an edge forwarding node, in some embodiments, is based on a condition faced by another forwarding node that results in that other forwarding node being unable to forward traffic to an intended next hop. For example, a particular forwarding node may be unable to connect to a hub forwarding node due to link degradation, congestion at the hub forwarding node because of another tenant, etc., according to some embodiments. In another example, the controller (or cloud gateway) in some embodiments can detect these conditions by pinging (e.g., sending ICMP messages) a hub forwarding node or set of hub forwarding nodes and detecting a slow response.

In some embodiments, the condition faced by a forwarding node is associated with a specified threshold, such as bandwidth thresholds, connection attempt thresholds (i.e., the number of failed attempts by a forwarding node to connect to another forwarding node), response time thresholds (i.e., how quickly a forwarding node responds to an ICMP message), etc. For example, the decision to augment the role of the edge forwarding node 1118 so that it operates as a hub forwarding node is based on a threshold number of failed connection attempts being exceeded when the gateway forwarding node 1120 tries to connect to the hub forwarding node 1122, in some embodiments. As mentioned above, the failed attempts could be due to congestion caused by heavy traffic from other tenants that use the hub forwarding node 1122, in some embodiments.

As a result of the congestion (or another condition), the controller in some embodiments determines that the cost of using the hub forwarding node 1120 becomes much greater than the cost of using the edge forwarding node 1118 as a hub forwarding node to deliver the traffic to its destination. Alternatively, or conjunctively, the forwarding nodes that experience the conditions make their own alternate route selections using route records provided by the controller (or cloud gateway), according to some embodiments.

In some embodiments, the forwarding nodes make their selections according to policy-based routing (PBR) rules. In some such embodiments, the forwarding nodes include metric generators that generate metrics for resolving the PBR rules. For example, a PBR rule can specify for a source (e.g., a branch office in Los Angeles) that if the traffic destination is X (e.g., a branch office in San Francisco), then the next hop is Y (e.g., a branch office in Fresno) if Y's delay is within 80% of a specified ideal range, and otherwise, the next hop is Z (e.g., a branch office in Las Vegas). Thus, if the edge forwarding node located at the source site determines that Y's delay is not within the range, the edge forwarding node would use Z as its next hop.

FIG. 11E illustrates the routing graph 1100 over which a third desirable path between the edge forwarding node 1110 and the edge forwarding node 1116 is transposed. Like the example of FIG. 11D, this example includes one edge forwarding node, this time edge forwarding node 1112, that is operating as a hub forwarding node in order to pass traffic from the edge forwarding node 1110 to the hub forwarding node 1122 for eventual delivery to the destination 1116. As the gateway 1120 is a multi-tenant forwarding node like the hub forwarding node 1122, heavy traffic from another tenant could bog down the gateway forwarding node 1120, thus creating a need for an alternate route and off-setting the normally higher cost of using the edge forwarding node 1112 in lieu of the gateway 1120.

FIG. 11F illustrates the routing graph 1100 over which a fourth desirable path between the edge forwarding node 1110 and the edge forwarding node 1116 is transposed. This fourth path uses the secondary hub functionalities of both the edge forwarding node 1112 and the edge forwarding node 1118. Unlike the examples in FIGS. 11C-11E, the example path in FIG. 11F includes an additional node for the traffic to traverse. It can be deduced that the extra cost of traversing the extra node, in addition to the extra cost of two edge forwarding nodes operating in their secondary functionalities as hub forwarding nodes, is now less than the cost of using the direct link between edge forwarding node 1110 and the gateway 1120 plus the cost of traversing the hub forwarding node 1122, according to some embodiments.

Lastly, FIG. 11G illustrates the routing graph 1100 over which a fifth desirable path (and least desirable of the 5 illustrated) between the edge forwarding node 1110 and the edge forwarding node 1116 is transposed. In this example, two edge forwarding nodes (e.g., 1114 and 1118) are again operating as hub forwarding nodes.

In some embodiments, the cost of using the path illustrated in FIG. 11F may be equal to the path illustrated in FIG. 11G, and other means to determine the best path may be used in lieu of cost. For example, in some embodiments, the controller may associate forwarding nodes with heuristic metrics, such as geolocation, the number of paths to get to a hub, and other path metrics. In some embodiments, the path in FIG. 11F may be more desirable, and less expensive, than the path in FIG. 11G based on the potential for additional traffic to edge forwarding node 1114, which provides access to the gateway forwarding node 1134 of an external site. While the example paths provided above are limited, the controller in some embodiments identifies every potential path between a source and destination, and selects the best path.

As mentioned above, different embodiments generate and utilize routing graphs differently. For instance, some embodiments only define one routing graph but allow edge nodes to serves as either edge forwarding nodes or as hub forwarding nodes by providing two different costs for each such edge node for the two different capacities under which it could operate (i.e., a first cost when it operates as an edge forwarding node and a second cost when it operates as a hub forwarding node). These embodiments then perform path searches on this common routing graph to conjunctively identify for pairs of sites connected by the SD-WAN (1) routes that use a particular edge node as only an edge forwarding element and (2) routes that also use the particular edge node as a hub forwarding element.

Figure 12:
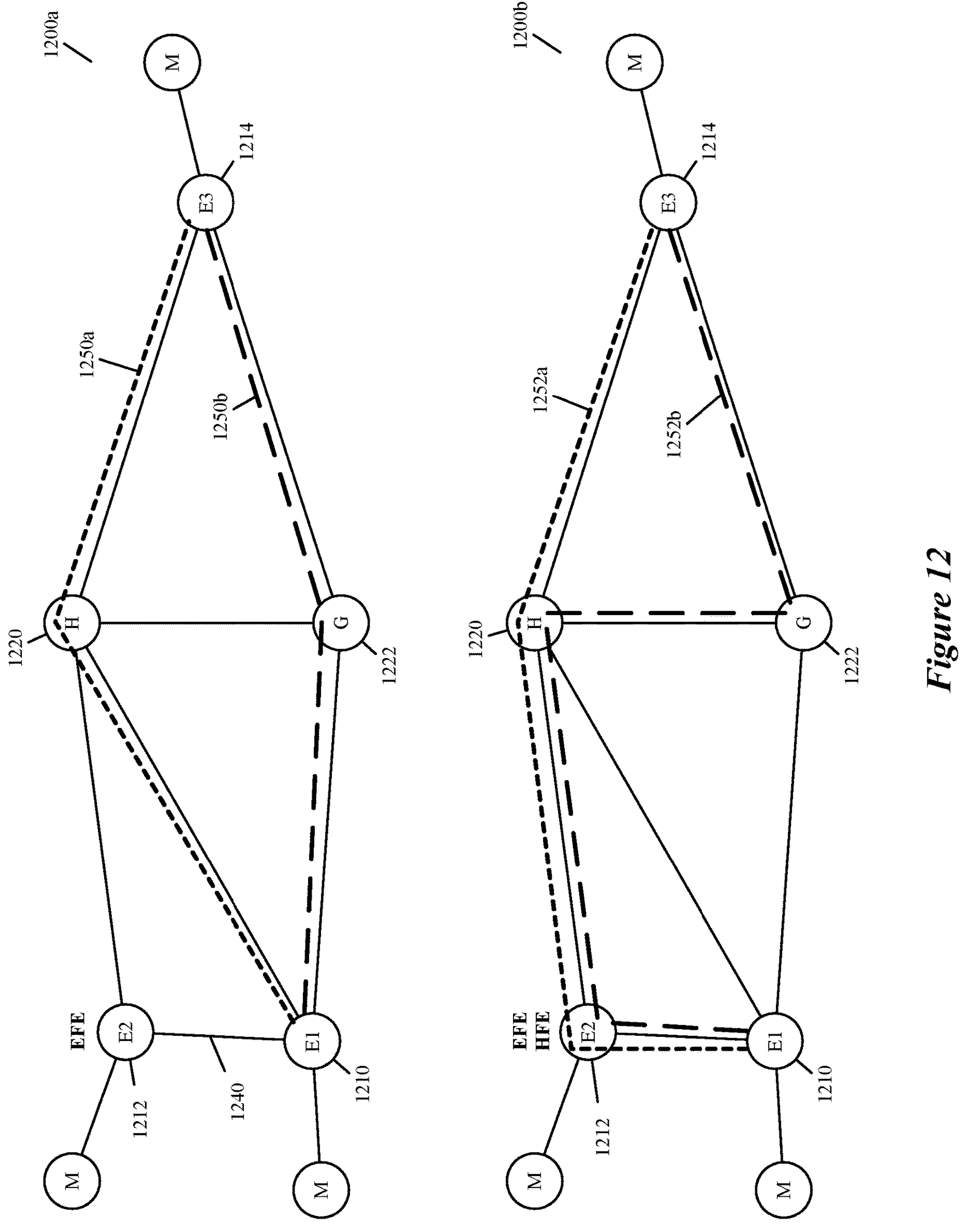
FIG. 12 illustrates an example of two routing graphs generated for an SD-WAN that treat one edge node differently.

Other embodiments, on the other hand, define two routing graphs with one routing graph not treating any edge forwarding node as a hub node, while the other routing graph allows the edge nodes to be edge forwarding nodes and hub forwarding nodes for some or all other edge nodes. These embodiments perform path searches on each routing graph to identify optimal routes between each pair of sites connected by the SD-WAN. FIG. 12 illustrates an example of two routing graphs 1200*a* and 1200*b* generated for an SD-WAN that treat one edge node 1212 ("E2") differently. In graph 1200*a*, the edge node 1212 is designated only with the acronym EFE to identify that it only operates as an edge forwarding element. As such, in this routing graph, node 1212 cannot be used to define routes from node 1210 to node 1214 (i.e., via link 1240), and instead all possible routes must pass through the hub node 1220 and/or the cloud gateway node 1222, as highlighted by the overlaid example routes 1250*a* and 1250*b*.

In the second graph 1200*b*, the edge node 1212 is designated with both the acronyms EFE and HFE to identify that it can operate as an edge forwarding element and a hub forwarding element. As such, in this routing graph, node 1212 can be used to define routes from node 1210 to node 1214 (i.e., via link 1240) as highlighted by the overlaid routes 1252*a* and 1252*b* that are shown from node 1210 to node 1214 through the node 1212. In some embodiments, different costs are associated with the node 1212 acting as an EFE or HFE, as described above with reference to FIGS. 11A-11G.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 13:
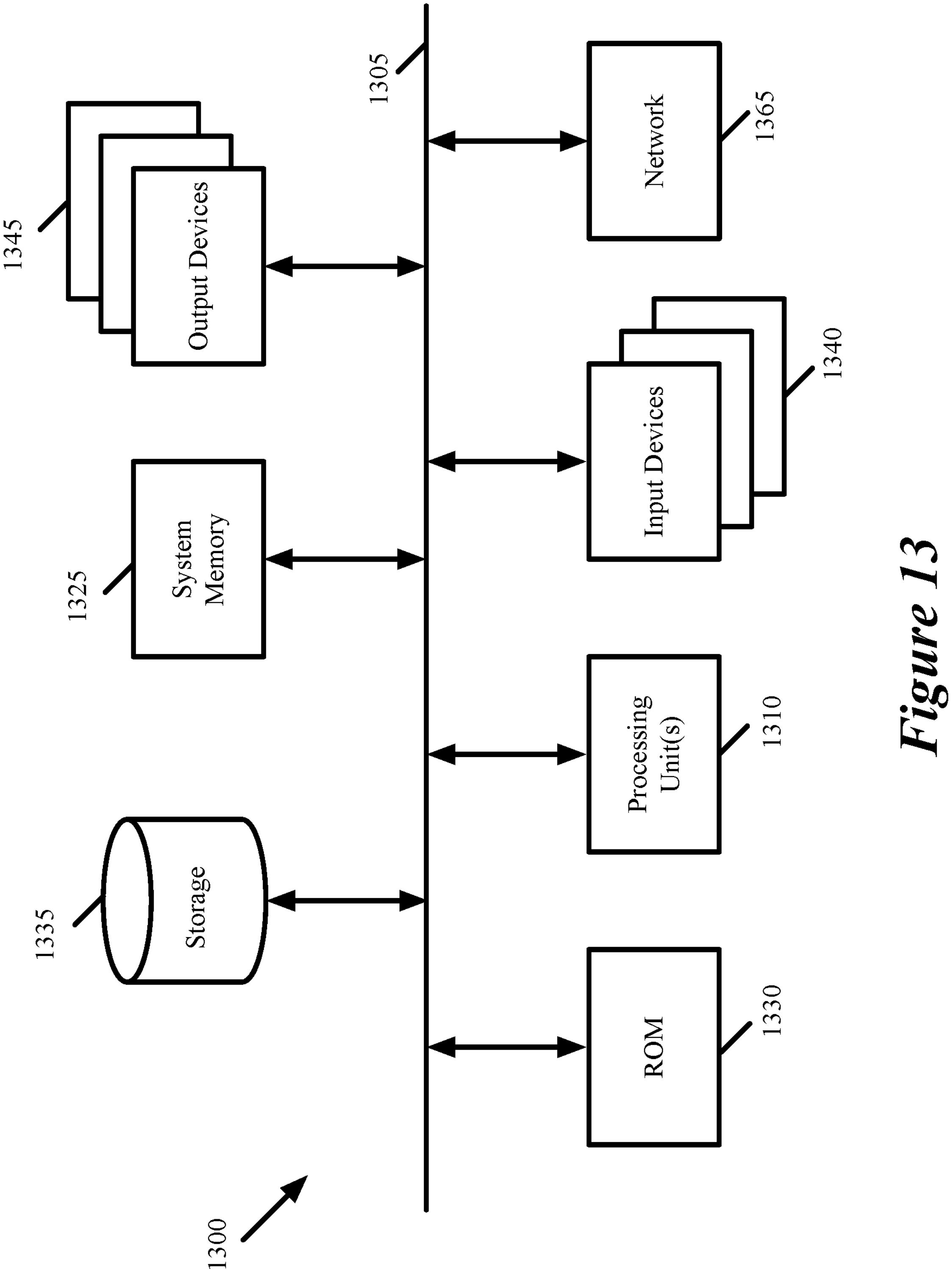
FIG. 13 conceptually illustrates a computer system with which some embodiments of the invention are implemented.

FIG. 13 conceptually illustrates a computer system 1300 with which some embodiments of the invention are implemented. The computer system 1300 can be used to implement any of the above-described hosts, controllers, gateway and edge forwarding elements. As such, it can be used to execute any of the above described processes. This computer system includes various types of non-transitory machine readable media and interfaces for various other types of machine readable media. Computer system 1300 includes a bus 1305, processing unit(s) 1310, a system memory 1325, a read-only memory 1330, a permanent storage device 1335, input devices 1340, and output devices 1345.

The bus 1305 collectively represents all system, peripheral, and chipset buses that communicatively connect the numerous internal devices of the computer system 1300. For instance, the bus 1305 communicatively connects the processing unit(s) 1310 with the read-only memory 1330, the system memory 1325, and the permanent storage device 1335.

From these various memory units, the processing unit(s) 1310 retrieve instructions to execute and data to process in order to execute the processes of the invention. The processing unit(s) may be a single processor or a multi-core processor in different embodiments. The read-only-memory (ROM) 1330 stores static data and instructions that are needed by the processing unit(s) 1310 and other modules of the computer system. The permanent storage device 1335, on the other hand, is a read-and-write memory device. This device is a non-volatile memory unit that stores instructions and data even when the computer system 1300 is off. Some embodiments of the invention use a mass-storage device (such as a magnetic or optical disk and its corresponding disk drive) as the permanent storage device 1335.

Other embodiments use a removable storage device (such as a floppy disk, flash drive, etc.) as the permanent storage device. Like the permanent storage device 1335, the system memory 1325 is a read-and-write memory device. However, unlike storage device 1335, the system memory is a volatile read-and-write memory, such as random access memory. The system memory stores some of the instructions and data that the processor needs at runtime. In some embodiments, the invention's processes are stored in the system memory 1325, the permanent storage device 1335, and/or the read-only memory 1330. From these various memory units, the processing unit(s) 1310 retrieve instructions to execute and data to process in order to execute the processes of some embodiments.

The bus 1305 also connects to the input and output devices 1340 and 1345. The input devices enable the user to communicate information and select commands to the computer system. The input devices 1340 include alphanumeric keyboards and pointing devices (also called "cursor control devices"). The output devices 1345 display images generated by the computer system. The output devices include printers and display devices, such as cathode ray tubes (CRT) or liquid crystal displays (LCD). Some embodiments include devices such as touchscreens that function as both input and output devices.

Finally, as shown in FIG. 13, bus 1305 also couples computer system 1300 to a network 1365 through a network adapter (not shown). In this manner, the computer can be a part of a network of computers (such as a local area network ("LAN"), a wide area network ("WAN"), or an Intranet), or a network of networks (such as the Internet). Any or all components of computer system 1300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several of the above-described embodiments deploy gateways in public cloud datacenters. However, in other embodiments, the gateways are deployed in a third party's virtual private cloud datacenters (e.g., datacenters that the third party uses to deploy cloud gateways for different entities in order to deploy virtual networks for these entities). Thus, one of ordinary skill in the art would understand that the invention is not to be limited by the foregoing illustrative details, but rather is to be defined by the appended claims.

The invention claimed is:

1. A method of facilitating routing through a software-defined wide area network (SD-WAN) defined for an entity, the method comprising:

at a first edge forwarding node located at a first multi-user compute site of the entity comprising a first set of machines:

determining whether a hub forwarding node at a datacenter site is in a degraded operational state based on a forwarding rule specifying a threshold value for a performance attribute of the hub forwarding node;

in response to determining that the hub forwarding node at the datacenter is not in a degraded operational state based on the threshold value not being violated, using a first route from the first multi-user compute site to a second multi-user compute site of the entity that traverses through the hub forwarding node at the datacenter site of the entity; and in response to determining that the hub forwarding node at the datacenter is in the degraded operational state based on the threshold value being violated:

automatically using a second edge forwarding node located at a third multi-user compute site as the hub forwarding node; and using a second route from the first multi-user compute site to the second multi-user compute site of the entity that traverses through the second edge forwarding node located at the third multi-user compute site that is used as the hub forwarding node.

2. The method of claim 1, wherein determining whether the hub forwarding node at the datacenter site is in the degraded operational state comprises sending an Internet control message protocol (ICMP) message to the hub forwarding node, and determining that a response time by the hub forwarding node exceeds the threshold value specified by one or more policy-based routing (PBR) rules in a set of PBR rules.

3. The method of claim 2, wherein the one or more PBR rules specify (i) use of the first route when the hub forwarding node is determined not to be in the degraded operational state based on a set of performance characteristics quantifying quality of a connection between the first multi-user compute site and the datacenter site meeting a set of threshold criteria, and (ii) use of the second route when the hub forwarding node is determined to be in the degraded operational state based on the set of performance characteristics not meeting the set of threshold criteria.

4. The method of claim 3, wherein the set of performance characteristics comprises one or more of latency, throughput, and bandwidth.

5. The method of claim 2, wherein a controller generates the one or more PBR rules based on routes identified in a routing graph generated by the controller, the routing graph identifying connections between forwarding nodes in the SD-WAN.

6. The method of claim 5, wherein the controller uses the generated routing graph to identify edge forwarding nodes that can serve as hub forwarding nodes in order to provide alternate routes between source and destination forwarding nodes when the hub forwarding node at the datacenter site has degraded performance.

7. The method of claim 6, wherein the entity is a first tenant, the SD-WAN is a first SD-WAN, and the hub forwarding node is of a set of multi-tenant hub forwarding nodes serving as hub forwarding nodes for a plurality of SD-WANs defined for a plurality of tenants; and the degraded performance of the set of multi-tenant hub forwarding nodes is caused by network activity of at least a second tenant served by the set of multi-tenant hub forwarding nodes.

8. The method of claim 5, wherein each edge forwarding node in the SD-WAN is associated with a set of SD-WAN profiles, each SD-WAN profile identifying at least one of a shared set of security, service, and policy parameters, wherein the controller generates the routing graph based on the sets of SD-WAN profiles.

9. The method of claim 1, wherein each of the first edge forwarding node and the second edge forwarding node located at the first multi-user compute site and the third multi-user compute site, respectively, serves as a spoke node in a hub-and-spoke architecture that uses the hub forwarding node at the datacenter site.

10. The method of claim 1, wherein the first route is associated with a first cost and the second route is associated with a second cost that is different from the first cost.

11. The method of claim 1, wherein using the second route from the first multi-user compute site to the second multi-user compute site that traverses through the second edge forwarding node located at the third multi-user compute site comprises:

establishing at least one tunnel between the first edge forwarding node located at the first multi-user compute site and the second edge forwarding node located at the third multi-user compute site; and establishing at least one tunnel between the second edge forwarding node located at the third multi-user compute site and a third edge forwarding node located at the second multi-user compute site.

12. A method of routing through a software-defined wide area network (SD-WAN) defined for an entity, the SD-WAN comprising (i) at least one datacenter site comprising a hub forwarding node and a plurality of server machines, and (ii) two or more multi-user compute sites each comprising one edge forwarding node to connect multiple user machines at their respective multi-user compute sites to the SD-WAN, the method comprising:

at a first edge forwarding node located at a first multi-user compute site of the entity comprising a first set of machines:

receiving two sets of routes to a second multi-user compute site of the entity, the first set of routes comprising a first route that traverses through a hub forwarding node at a datacenter site of the entity and the second set of routes comprising a second route that traverses through a second edge forwarding node located at a third multi-user compute site that is used as the hub forwarding node for packets from the first multi-user compute site to the second multi-user compute site when the hub forwarding node at the datacenter site has degraded performance;

when the hub forwarding node does not have degraded performance based on a threshold value for a performance attribute of the hub forwarding node not being violated, using the first route for packet flows from the first multi-user compute site to the second multi-user compute site through the datacenter site; and when the hub forwarding node has degraded performance based on the threshold value for the performance attribute of the hub forwarding node being violated, automatically using the second route for packet flows from the first multi-user compute site to the second multi-user compute site through the third multi-user compute site.

13. The method of claim 12, wherein using the first route and the second route comprises using at least a set of one or more policy-based routing (PBR) rules that specify (i) use of the first route when a set of performance characteristics quantifying quality of a connection between the first multi-user compute site and the datacenter site meets a set of threshold criteria, and (ii) use of the second route when the set of performance characteristics does not meet the set of threshold criteria.

14. The method of claim 13, wherein the set of performance characteristics comprises one or more of latency, throughput, and bandwidth.

15. The method of claim 13, wherein each route in the first set of routes and the second set of routes is associated with a respective cost, wherein the first route is associated with a first cost and the second route is associated with a second cost that is different from the first cost.

16. The method of claim 12, wherein using the second route for packet flows from the first multi-user compute site to the second multi-user compute site through the third multi-user compute site comprises:

establishing at least one tunnel between the first edge forwarding node located at the first multi-user compute site and the second edge forwarding node located at the third multi-user compute site; and establishing at least one tunnel between the second edge forwarding node located at the third multi-user compute site and a third edge forwarding node located at the third second multi-user compute site.

17. A method of routing packets through a software-defined wide area network (SD-WAN) defined for an entity, the method comprising:

at a first edge forwarding node located at a first multi-machine site of the entity, the first multi-machine site at a first physical location and comprising a first set of machines:

serving as an edge forwarding node for the first set of machines by forwarding packets between the first set of machines and other machines associated with the entity via other forwarding nodes in the SD-WAN;

in response to determining that a hub forwarding node at a datacenter is in a degraded operational state based on a threshold value for a performance attribute of the hub forwarding node being violated, receiving configuration data specifying for the first edge forwarding node to serve as the hub forwarding node for forwarding a set of packets from a second set of machines associated with the entity and operating at a second multi-machine site at a second physical location to a third set of machines associated with the entity and operating at a third multi-machine site at a third physical location; and automatically serving as the hub forwarding node to forward the set of packets from the second set of machines to the third set of machines.

18. The method of claim 17, wherein serving as the hub forwarding node to forward the set of packets from the second set of machines to the third set of machines comprises:

receiving the set of packets from a second edge forwarding node of the second multi-machine site; and forwarding the set of packets to a third edge forwarding node of the third multi-machine site for delivery to the third set of machines.

19. The method of claim 18, wherein the set of packets are received from the second edge forwarding node through a first tunnel between the first edge forwarding node and the second edge forwarding node, and forwarded to the third edge forwarding node through a second tunnel between the first edge forwarding node and the third edge forwarding node.

20. The method of claim 19, wherein forwarding the set of packets to the third edge forwarding node through the second tunnel further comprises, for each packet in the set, (i) removing a first tunnel header identifier associated with the first tunnel, and (ii) inserting a second tunnel header identifier associated with the second tunnel.

* * * * *